United States Patent
Clark

(10) Patent No.: US 11,921,200 B1
(45) Date of Patent: Mar. 5, 2024

(54) LIVE DOWN SONAR VIEW

(71) Applicant: Navico, Inc., Tulsa, OK (US)

(72) Inventor: Jeremiah D. Clark, Tulsa, OK (US)

(73) Assignee: NAVICO, INC., Tulsa, OK (US)

( * ) Notice: Subject to any disclaimer, the term of this patent is extended or adjusted under 35 U.S.C. 154(b) by 0 days.

(21) Appl. No.: 17/891,346

(22) Filed: Aug. 19, 2022

(51) Int. Cl.
*G01S 15/89* (2006.01)
*G01S 7/32* (2006.01)
(Continued)

(52) U.S. Cl.
CPC .............. *G01S 15/89* (2013.01); *G01S 7/521* (2013.01); *G01S 7/53* (2013.01); *G01S 7/56* (2013.01);
(Continued)

(58) Field of Classification Search
CPC .......... G01S 15/89; G01S 15/88; G01S 15/96; G01S 15/8902; G01S 1/72; G01S 1/766; G01S 1/82; G01S 1/802; G01S 1/805; G01S 1/807; G01S 1/78; G01S 1/783; G01S 1/786; G01S 7/52; G01S 7/521; G01S 7/52017; G01S 7/52019; G01S 7/52023; G01S 7/52077; G01S 7/52085;
(Continued)

(56) References Cited

U.S. PATENT DOCUMENTS

| | | |
|---|---|---|
| 5,311,095 A | 5/1994 | Smith et al. |
| 5,329,496 A | 7/1994 | Smith |

(Continued)

FOREIGN PATENT DOCUMENTS

| | | |
|---|---|---|
| AU | 2004258175 B2 | 9/2009 |
| AU | 2009283312 B8 | 6/2015 |

(Continued)

OTHER PUBLICATIONS

Thompson et al; "Two Dimensional and Three Dimensional Imaging Results Using Blazed Arrays;" MTS/IEEE Oceans 2001. An Ocean Odyssey. Conference Proceedings (IEEE Cat. No.01CH37295); Nov. 5-8, 2001; pp. 985-988.

(Continued)

*Primary Examiner* — Daniel L Murphy
*Assistant Examiner* — Amie M Ndure
(74) *Attorney, Agent, or Firm* — Nelson Mullins Riley & Scarborough LLP

(57) ABSTRACT

A sonar system is provided for generating live sonar images having an expanded coverage angle. The sonar system includes a first sonar transducer assembly defining a first facing direction and having array(s) of sonar transducer elements and a second sonar transducer assembly defining a second facing direction and having array(s) of sonar transducer elements. The sonar system includes processor(s) and a memory including computer program code configured to, when executed, cause the processor(s) to receive first and second sonar return data from the first and second plurality of sonar transducer assemblies, receive first and second facing direction data for the first and second sonar transducer assemblies, position first and second sonar return data based on the first and second facing direction data to form positioned first and second sonar return data, and generate a live sonar image of the underwater environment using the positioned first and second sonar return data.

21 Claims, 27 Drawing Sheets

(51) Int. Cl.
*G01S 7/521* (2006.01)
*G01S 7/53* (2006.01)
*G01S 7/56* (2006.01)
*G06T 3/40* (2006.01)

(52) U.S. Cl.
CPC ........ *G06T 3/4038* (2013.01); *G06T 2200/32* (2013.01)

(58) Field of Classification Search
CPC . G01S 7/53; G01S 7/534; G01S 7/536; G01S 7/539; G01S 7/537; G01S 7/56; G01S 7/58; G01S 7/60; G06T 3/4038; G06T 3/4053; G06T 7/00; G06T 7/70; G06T 7/97; G06T 2200/03
USPC .......................................................... 367/7
See application file for complete search history.

(56) References Cited

U.S. PATENT DOCUMENTS

| | | |
|---|---|---|
| 5,548,564 A | 8/1996 | Smith |
| 5,744,898 A | 4/1998 | Smith et al. |
| 5,923,617 A | 7/1999 | Thompson et al. |
| 6,678,210 B2 | 1/2004 | Rowe |
| 7,035,166 B2 | 4/2006 | Zimmerman et al. |
| 7,106,656 B2 | 9/2006 | Lerro et al. |
| 7,123,546 B2 | 10/2006 | Zimmerman et al. |
| 7,173,879 B2 | 2/2007 | Zimmerman et al. |
| 7,330,399 B2 | 2/2008 | Lerro et al. |
| 7,355,924 B2 | 4/2008 | Zimmerman et al. |
| 7,453,769 B2 | 11/2008 | Kirschner et al. |
| 7,542,376 B1 | 6/2009 | Thompson et al. |
| 7,542,377 B2 | 6/2009 | Kirschner et al. |
| 7,606,114 B2 | 10/2009 | Bachelor et al. |
| 7,847,925 B2 | 12/2010 | Vogt |
| 7,852,709 B1 | 12/2010 | Lerro et al. |
| 7,889,600 B2 | 2/2011 | Thompson et al. |
| 7,957,609 B2 | 6/2011 | Lu et al. |
| 8,254,208 B2 | 8/2012 | Vogt |
| 8,300,499 B2 | 10/2012 | Coleman et al. |
| 8,345,511 B1 | 1/2013 | Rikoski |
| 8,514,659 B2 | 8/2013 | Vogt |
| 8,638,362 B1 | 1/2014 | Thompson et al. |
| 8,717,847 B2 | 5/2014 | Blake |
| 8,811,120 B2 | 8/2014 | Bachelor et al. |
| 8,814,795 B2 | 8/2014 | Derode et al. |
| RE45,379 E | 2/2015 | Rowe |
| 8,964,507 B2 | 2/2015 | Bachelor et al. |
| 9,182,486 B2 | 11/2015 | Brown et al. |
| RE45,823 E | 12/2015 | Vogt |
| 9,218,799 B2 | 12/2015 | Stytsenko et al. |
| 9,322,915 B2 | 4/2016 | Betts et al. |
| 9,386,964 B2 | 7/2016 | Bagge |
| 9,664,783 B2 | 5/2017 | Brown et al. |
| 9,739,884 B2 | 8/2017 | Proctor et al. |
| 9,766,328 B2 | 9/2017 | Black et al. |
| 9,784,825 B2 | 10/2017 | Brown et al. |
| 9,784,826 B2 | 10/2017 | Matson et al. |
| 9,812,118 B2 | 11/2017 | Matson et al. |
| 9,846,232 B1 | 12/2017 | Thompson et al. |
| 9,947,309 B2 | 4/2018 | Stokes et al. |
| 10,019,002 B2 | 7/2018 | Harnett et al. |
| 10,067,228 B1 | 9/2018 | Steenstrup et al. |
| 10,107,908 B2 | 10/2018 | Betts et al. |
| 10,114,119 B2 | 10/2018 | Horner et al. |
| 10,197,674 B2 | 2/2019 | Thompson et al. |
| 10,215,849 B2 | 2/2019 | Kozuki |
| 10,241,200 B2 | 3/2019 | Sayer et al. |
| 10,310,062 B2 | 6/2019 | Coleman et al. |
| 10,365,356 B2 | 7/2019 | Stokes et al. |
| 10,408,933 B1 | 9/2019 | DeHart et al. |
| 10,502,820 B2 | 12/2019 | Zimmerman et al. |
| 10,514,451 B2 | 12/2019 | Brown et al. |
| 10,545,226 B2 | 1/2020 | Wigh et al. |
| 10,605,913 B2 | 3/2020 | Coleman et al. |
| 10,852,429 B2 | 12/2020 | Gatland |
| 10,890,660 B2 | 1/2021 | Wigh et al. |
| 10,914,810 B2 | 2/2021 | Laster et al. |
| 11,059,556 B2 | 7/2021 | Ahlgren |
| 11,125,866 B2 | 9/2021 | Sumi et al. |
| 11,639,996 B2 * | 5/2023 | Clark ................. G01S 7/6245 367/11 |
| 2003/0235112 A1 | 12/2003 | Zimmerman et al. |
| 2005/0007882 A1 | 1/2005 | Bachelor et al. |
| 2007/0159922 A1 | 7/2007 | Zimmerman et al. |
| 2010/0067330 A1 | 3/2010 | Collier et al. |
| 2010/0074057 A1 | 3/2010 | Bachelor et al. |
| 2010/0284248 A1 | 11/2010 | Wang et al. |
| 2011/0013485 A1 | 1/2011 | Maguire |
| 2014/0050051 A1 | 2/2014 | Vogt |
| 2014/0092709 A1 | 4/2014 | Miller et al. |
| 2017/0031022 A1 | 2/2017 | Ivanov |
| 2017/0031023 A1 | 2/2017 | Ivanov |
| 2017/0038344 A1 | 2/2017 | Capus et al. |
| 2017/0212230 A1 | 7/2017 | Wigh et al. |
| 2017/0371039 A1 | 12/2017 | Clark et al. |
| 2018/0100922 A1 | 4/2018 | Wigh et al. |
| 2018/0224544 A1 | 8/2018 | Ivanov |
| 2018/0259339 A1 * | 9/2018 | Johnson ............... G05D 1/0692 |
| 2018/0275649 A1 | 9/2018 | Harnett et al. |
| 2019/0079185 A1 | 3/2019 | Steenstrup et al. |
| 2019/0113619 A1 | 4/2019 | Laster |
| 2019/0235075 A1 | 8/2019 | Thompson et al. |
| 2019/0242994 A1 | 8/2019 | Wanis et al. |
| 2019/0251356 A1 * | 8/2019 | Rivers ................. G01C 21/203 |
| 2019/0265354 A1 | 8/2019 | Antao et al. |
| 2020/0011965 A1 | 1/2020 | Stokes et al. |
| 2020/0011981 A1 | 1/2020 | Stokes et al. |
| 2020/0057488 A1 * | 2/2020 | Johnson ................. G06T 19/20 |
| 2020/0072953 A1 | 3/2020 | Wigh et al. |
| 2020/0088840 A1 | 3/2020 | Stokes et al. |
| 2020/0103512 A1 | 4/2020 | Brown et al. |
| 2020/0116843 A1 | 4/2020 | Zimmerman et al. |
| 2020/0158842 A1 | 5/2020 | Wigh et al. |
| 2020/0256967 A1 | 8/2020 | Wigh et al. |
| 2020/0300994 A1 | 9/2020 | Matson et al. |
| 2021/0096244 A1 | 4/2021 | Wigh et al. |
| 2021/0132204 A1 * | 5/2021 | Caspall ................ G10K 11/343 |
| 2021/0141048 A1 | 5/2021 | Laster et al. |
| 2021/0141087 A1 * | 5/2021 | Cunningham .......... G01S 15/42 |
| 2021/0165068 A1 | 6/2021 | Clark |
| 2021/0173061 A1 | 6/2021 | Fyler et al. |
| 2021/0263150 A1 | 8/2021 | Stokes |
| 2021/0364636 A1 | 11/2021 | Simonton |
| 2021/0389439 A1 | 12/2021 | Sumi et al. |
| 2022/0026570 A1 * | 1/2022 | Cunningham .......... G01S 7/539 |
| 2022/0035026 A1 * | 2/2022 | Proctor ................... G01S 15/42 |
| 2022/0035027 A1 * | 2/2022 | Proctor ................. G01S 7/6209 |
| 2022/0113393 A1 | 4/2022 | Nishimori et al. |
| 2022/0120882 A1 | 4/2022 | Coleman et al. |
| 2022/0153262 A1 * | 5/2022 | Gallo ..................... G01S 7/417 |
| 2022/0171056 A1 * | 6/2022 | Cunningham .......... G01S 7/539 |
| 2022/0172464 A1 * | 6/2022 | Ross ..................... G06V 20/10 |
| 2022/0373678 A1 * | 11/2022 | Combs ................... G01S 15/96 |
| 2022/0381906 A1 * | 12/2022 | Combs ................... G01S 7/527 |
| 2023/0125477 A1 * | 4/2023 | Gurumurthy ............ G06N 3/08 382/103 |
| 2023/0233940 A1 * | 7/2023 | van Welzen .......... A63F 13/213 463/31 |

FOREIGN PATENT DOCUMENTS

| | | |
|---|---|---|
| AU | 2019213353 A1 | 8/2019 |
| AU | 2019203322 B2 | 12/2020 |
| CA | 2530290 C | 11/2015 |
| CA | 2899119 A1 | 1/2017 |
| CA | 2928461 A1 | 1/2017 |
| CA | 2993361 A1 | 2/2017 |
| CA | 3032163 A1 | 8/2019 |
| CA | 3042656 A1 | 11/2019 |
| CN | 105759257 A | 7/2016 |
| CN | 110493698 A | 11/2019 |
| EP | 1925949 A1 | 5/2008 |

(56) References Cited

FOREIGN PATENT DOCUMENTS

| | | |
|---|---|---|
| EP | 2294452 B1 | 12/2011 |
| EP | 2612165 A1 | 7/2013 |
| EP | 3084467 A2 | 10/2016 |
| EP | 3144700 A1 | 3/2017 |
| EP | 1656568 B1 | 12/2017 |
| EP | 3325997 A1 | 5/2018 |
| EP | 3479138 A1 | 5/2019 |
| EP | 3572837 A1 | 11/2019 |
| EP | 2326970 B1 | 10/2020 |
| EP | 2956796 B1 | 4/2022 |
| EP | 4009069 A1 | 6/2022 |
| JP | 2004-080577 A | 3/2004 |
| JP | 2007-535195 A | 11/2007 |
| JP | 2008-508539 A | 3/2008 |
| JP | 2010-261883 A | 11/2010 |
| JP | 5600678 B2 | 10/2014 |
| JP | 5688197 B2 | 3/2015 |
| JP | 2016-510106 A | 4/2016 |
| JP | 2017-227489 A | 12/2017 |
| JP | 6444319 B2 | 12/2018 |
| JP | 2019-030623 A | 2/2019 |
| JP | 2020-039841 A | 3/2020 |
| JP | 6732274 B1 | 7/2020 |
| JP | 6737464 B2 | 8/2020 |
| JP | 2020-141250 A | 9/2020 |
| JP | 2020-155900 A | 9/2020 |
| KR | 200184719 Y1 | 6/2000 |
| WO | 94/09605 A1 | 4/1994 |
| WO | 2005/008272 A2 | 1/2005 |
| WO | 2006/017511 A2 | 2/2006 |
| WO | 2012/028896 A1 | 3/2012 |
| WO | 2013/126761 A1 | 8/2013 |
| WO | 2014/126847 A2 | 8/2014 |
| WO | 2017/015741 A1 | 2/2017 |
| WO | 2018/222566 A1 | 12/2018 |
| WO | 2019/050552 A1 | 3/2019 |
| WO | 2020/174640 A1 | 9/2020 |
| WO | 2021/019858 A1 | 2/2021 |
| WO | 2021/127592 A2 | 6/2021 |
| WO | 2021/176726 A1 | 9/2021 |
| WO | 2021/220377 A1 | 11/2021 |

OTHER PUBLICATIONS

SeaBotix—Underwater Remotely Operated Vehicles (ROVs); ADS, Inc. YouTube. 2014 Video (mentioning SmartFlight): retreived Jul. 29, 2020 from https://www.youtube.com/watch?v=hkqJh5j6eQA.

SmartFlight 2.0 video; retrieved Jul. 29, 2020 from: http://www.teledynemarine.com/smartflight2-0?ProductLineID=112.

"Garmin Marine Webinars: Panoptix LiveScope Installation and Setup;" YouTube; Apr. 6, 2020; retreived Jan. 12, 2021 from https://www.youtube.com/watch?v=Z2AiSOmX5PA.

Nov. 26, 2021 Extended European Search Report issued in European Patent Application No. 21177698.4; 8 pp.

RyTek Marine (Apr. 6, 2022). Seeing double isn't always a bad thing . . . ; retreived Sep. 30, 2022 from https://www.facebook.com/RyTekMarine.

"Open Access Review: a Review of Acoustic Impedance Matching Techniques for Piezoelectric Sensors and Transducers;" Sensors; vol. 20; No. 14; Jul. 21, 2020; DOI: https://doi.org/10.3390/s20144051.

"Active Target 'Scout Only' Transducer Mount Combo;" RyTek Marine; retreived Aug. 10, 2022 from https://rytekmarine.com/collections/lowrance-activetarget/products/active-target-scout-only-transducer-mount-combo.

* cited by examiner

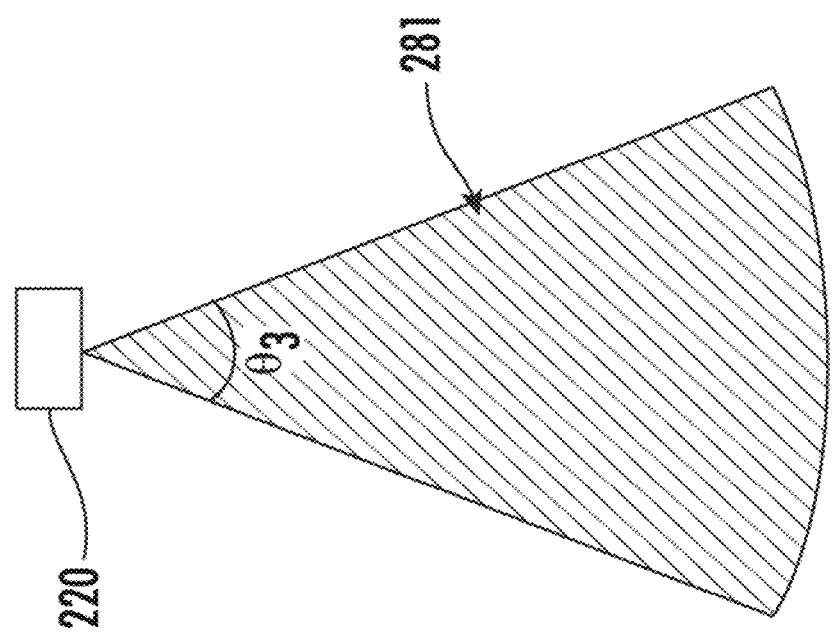

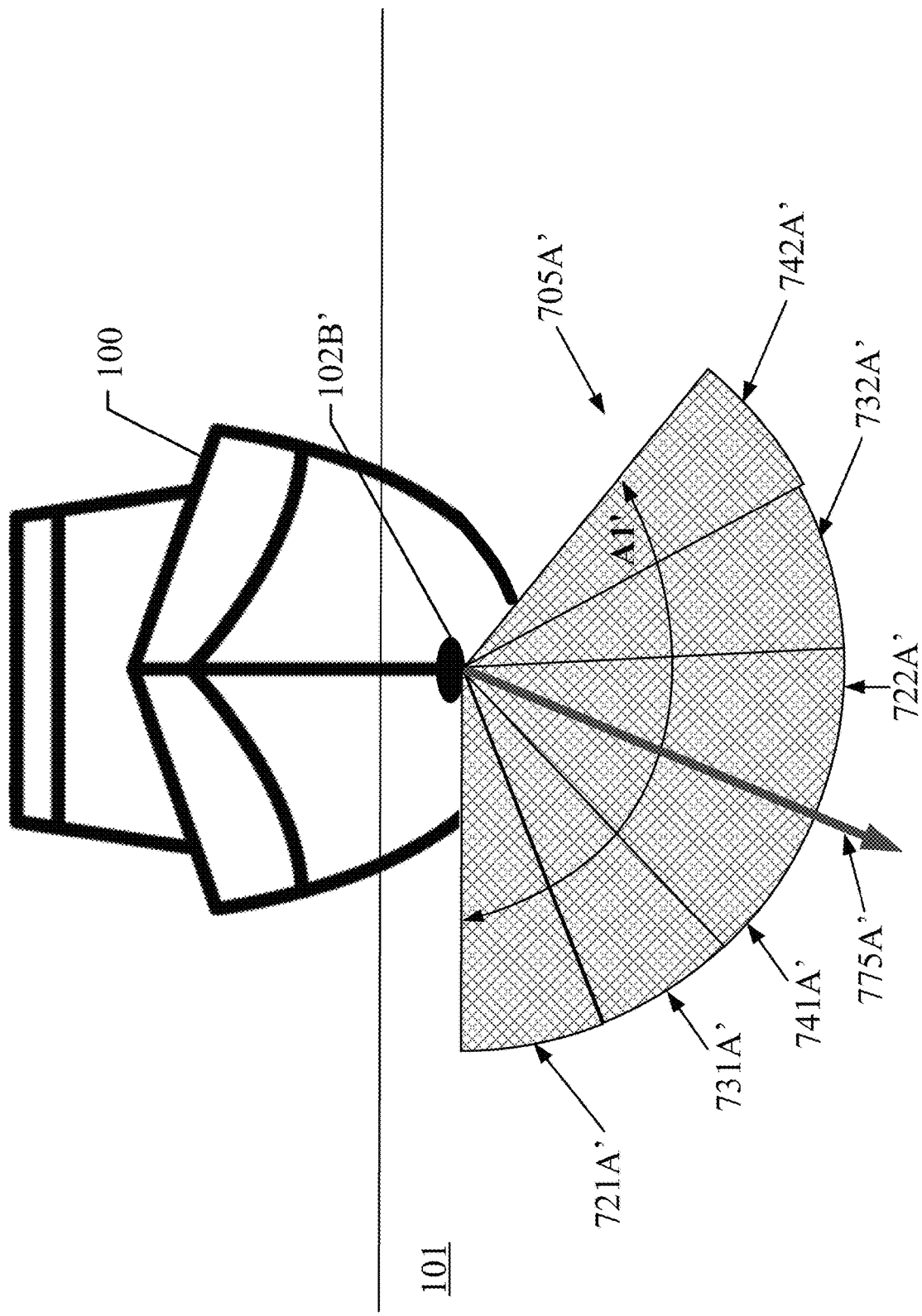

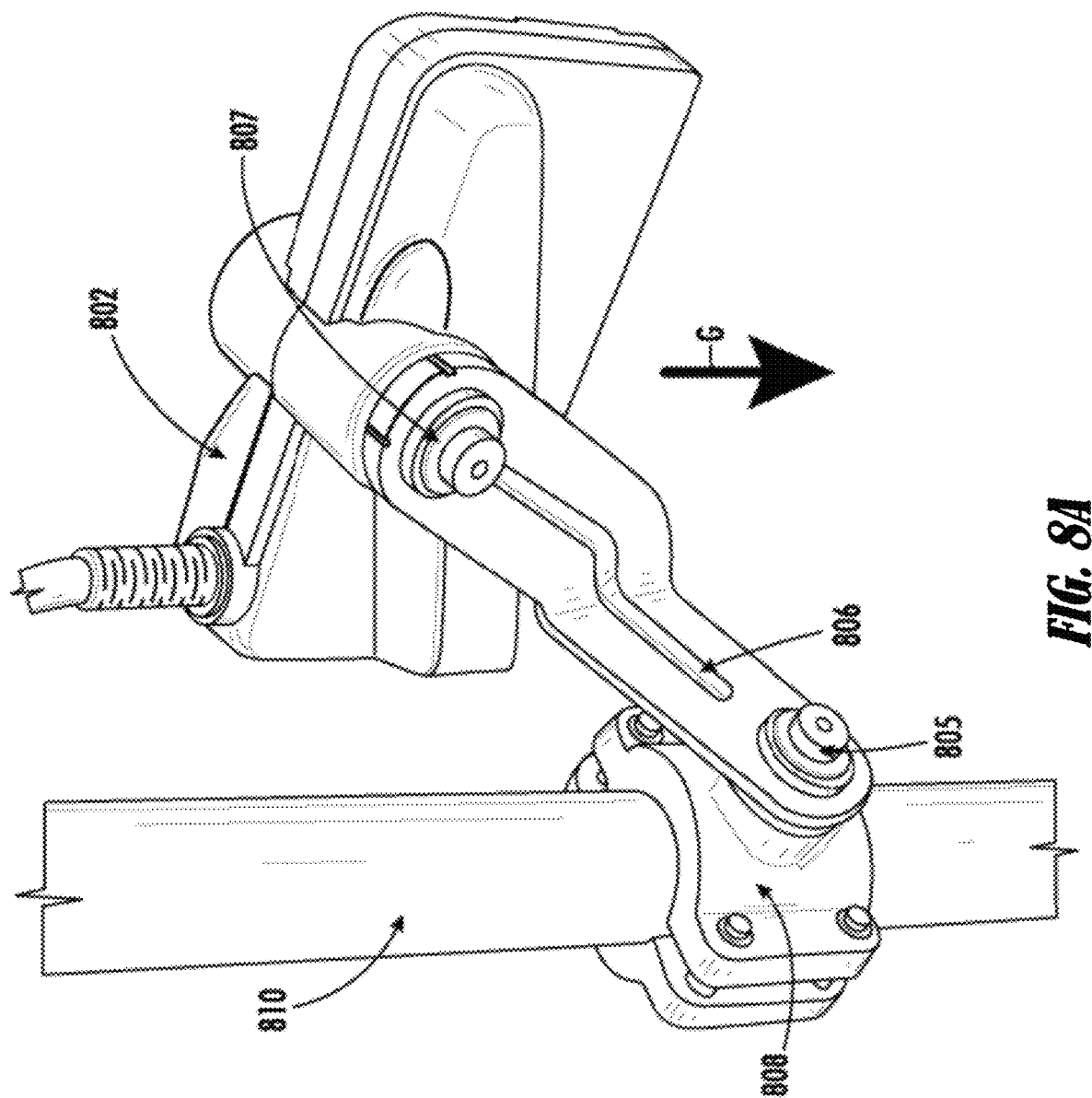

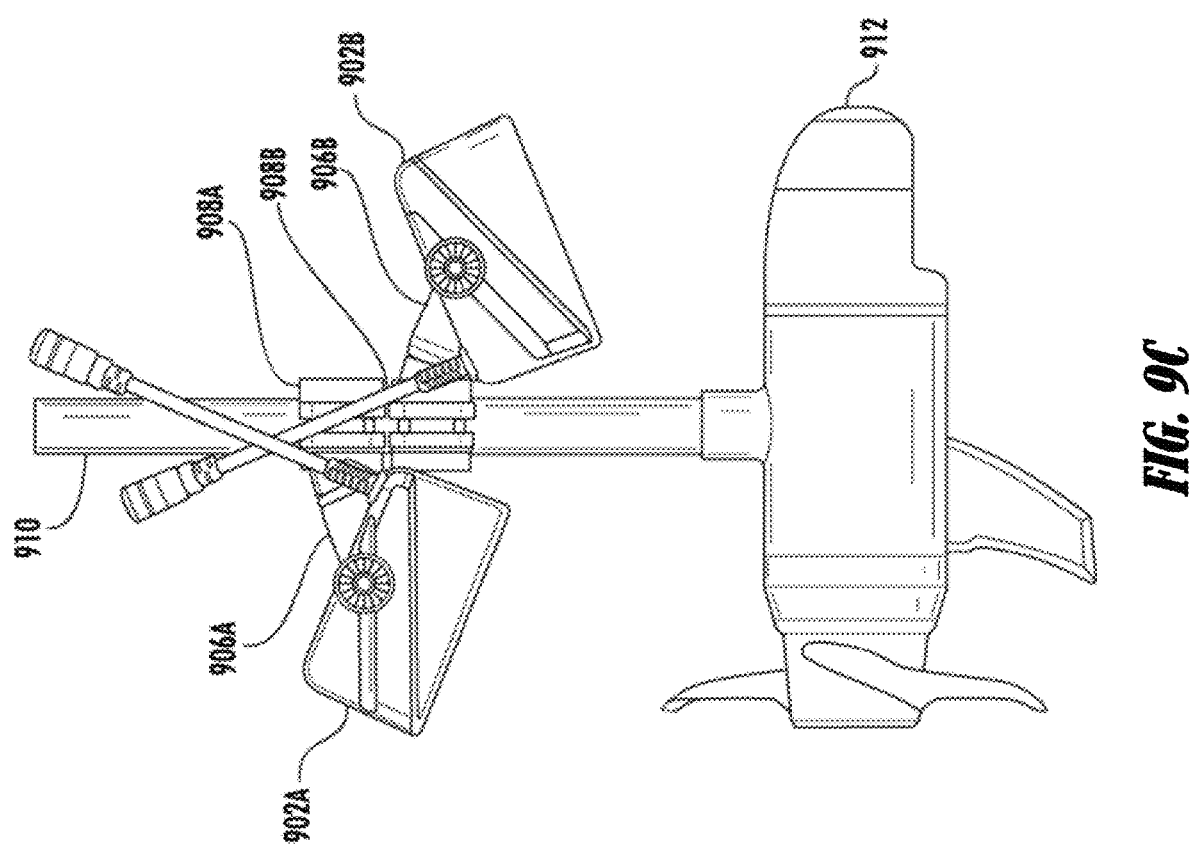

LIVE DOWN SONAR VIEW

FIELD OF THE INVENTION

Embodiments of the present invention relate generally to a sonar transducer system configured to provide live sonar images with an expanded coverage volume.

BACKGROUND OF THE INVENTION

Sonar transducer assemblies have been provided that provide sonar coverage for volumes that are underneath a watercraft. However, to date, the angle of sonar coverage has been limited for these sonar transducer assemblies. Sonar transducer assemblies often provide only a limited sonar coverage angle of 135 degrees or less. Where the sonar coverage angle is 135 degrees, volumes are left on both sides of the sonar coverage that are not covered, with these uncovered volumes totaling 45 degrees or more. For example, where the facing direction of a sonar transducer assembly is directed straight down, and uncovered volumes may be provided on both sides having angles of 22.5 degrees each. Alternatively, the facing direction may be altered so that the edge of the sonar coverage generally aligns with the water surface, but this would still result in an angle of 45 degrees of uncovered volume at the rear of the coverage.

BRIEF SUMMARY OF THE INVENTION

In various example embodiments provided herein, sonar systems are provided having expanded coverage volumes. Multiple sonar transducer assemblies may be used in conjunction with each other, and the sonar systems may be configured to control the facing directions of the sonar transducer assemblies so that an expanded coverage volume may be obtained. While a single sonar transducer assembly is often limited to coverage angles of 135 degrees or less, the use of multiple sonar transducer assemblies may permit expanded coverage angles of 140 degrees or more, 150 degrees or more, or even 180 degrees or more. Sonar transducer assemblies may be oriented so that they possess facing directions that are at least partially in the downward direction. In some embodiments, the sonar transducer assemblies may provide continuous side-to-side downward coverage or continuous front-to-back downward coverage relative to a watercraft. The sonar transducer assemblies may be frequency steered in some cases. Sonar return data from the sonar transducer assemblies may be utilized to form live sonar images, and the live sonar images may be two-dimensional sonar images.

In an example embodiment, a sonar system for generating live sonar images having an expanded coverage angle is provided. The sonar system comprises two or more sonar transducer assemblies including a first sonar transducer assembly that has a first plurality of sonar transducer elements. The first sonar transducer assembly defines a first facing direction. The first plurality of sonar transducer elements are configured to transmit one or more first sonar beams into an underwater environment to form a first coverage volume within the underwater environment. A second sonar transducer assembly has a second plurality of sonar transducer elements. The second sonar transducer assembly defines a second facing direction. The second plurality of sonar transducer elements are configured to transmit one or more second sonar beams into the underwater environment to form a second coverage volume within the underwater environment. The sonar system further includes one or more alignment features, wherein the one or more alignment features are configured to position the first sonar transducer assembly and the second sonar transducer assembly so that the first facing direction and the second facing direction are different and relative to each other so as to create continuous coverage of the underwater environment. The continuous coverage has an overall coverage volume that is greater than either of the first coverage volume or the second coverage volume individually. The sonar system further includes at least one processor and a memory including computer program code configured to, when executed, cause the at least one processor to receive first sonar return data from the first plurality of sonar transducer elements; receive second sonar return data from the second plurality of sonar transducer elements; receive first facing direction data regarding the first facing direction of the first sonar transducer assembly; receive second facing direction data regarding the second facing direction of the second sonar transducer assembly; position the first sonar return data based on the first facing direction data to form positioned first sonar return data; position the second sonar return data based on the second facing direction data to form positioned second sonar return data; and generate a live sonar image of the underwater environment using the positioned first sonar return data and the positioned second sonar return data. The first facing direction and the second facing direction are generally outward and downward of the watercraft such that the live sonar image is representative of the underwater environment underneath the watercraft.

In some embodiments, an overlap volume is defined as a volume where the first coverage volume and the second coverage volume overlap. In some embodiments, sonar return data from only one of the first sonar transducer assembly or the second sonar transducer assembly is used in the overlap volume. In some embodiments, sonar return data from both the first sonar transducer assembly and the second sonar transducer assembly is used in the overlap volume.

In some embodiments, the first sonar transducer assembly includes a first sensor configured to obtain the first facing direction data regarding the first facing direction of the first sonar transducer assembly relative to the watercraft. The second sonar transducer assembly includes a second sensor configured to obtain the second facing direction data regarding the second facing direction of the second sonar transducer assembly relative to the watercraft. The computer program code is configured to, when executed, cause the at least one processor to: receive the first facing direction data from the first sensor; and receive the second facing direction data from the second sensor.

In some embodiments, the sonar system further comprises at least one bracket, wherein the at least one bracket is configured to position the first sonar transducer assembly and the second sonar transducer assembly, and wherein the one or more alignment features are provided on the at least one bracket. In some embodiments, the at least one bracket includes a first bracket and a second bracket, wherein the first bracket is configured to position the first sonar transducer assembly, and wherein the second bracket is configured to position the second sonar transducer assembly. In some embodiments, the sonar system further comprises a first clamp, wherein the at least one bracket is configured to be attached to the first clamp, and wherein the at least one bracket is configured to be rotated relative to the first clamp when attached to the first clamp. In some embodiments, the sonar system further comprises a second clamp, wherein the at least one bracket includes a first bracket and a second bracket, wherein the first bracket is configured to be attached to the first clamp, and wherein the second bracket is configured to be attached to the second clamp.

In some embodiments, the overall coverage volume includes a downward coverage angle, wherein the downward coverage angle defines an angle that is at least 140 degrees.

In some embodiments, the overall coverage volume includes a downward coverage angle, wherein the downward coverage angle defines an angle that is at least 150 degrees.

In some embodiments, the overall coverage volume includes a downward coverage angle, wherein the downward coverage angle defines an angle that is at least 180 degrees. In some embodiments, the downward coverage angle provides at least 180 degrees of continuous side-to-side downward coverage. In some embodiments, the downward coverage angle provides at least 180 degrees of continuous front-to-back downward coverage.

In some embodiments, the two or more sonar transducer assemblies are rotatably mounted with respect to the watercraft such that the overall coverage angle rotates with respect to the watercraft.

In some embodiments, the sonar system further comprises a display, wherein the memory including computer program code is configured to, when executed, cause the at least one processor to: cause the first plurality of sonar transducer elements and the second plurality of sonar transducer elements to transmit the one or more sonar beams into the underwater environment; and cause, on the display, presentation of the live sonar image. The live sonar image is a two-dimensional live sonar image that is formed of the first sonar return data and second sonar return data. The first sonar return data and the second sonar return data used to form the live sonar image were received at substantially a same time by the first plurality of sonar transducer elements and the second plurality of sonar transducer elements.

In some embodiments, the first facing direction is at least partially in a forward direction relative to the watercraft, wherein the second facing direction is at least partially in a backward direction relative to the watercraft.

In another example embodiment, a sonar system for generating live sonar images having an expanded coverage angle is provided. The sonar system comprises a first sonar transducer assembly having at least one array of a first plurality of sonar transducer elements, wherein the first sonar transducer assembly defines a first facing direction. The sonar system further includes one or more alignment features, wherein the one or more alignment features are configured to position the first sonar transducer assembly to obtain the first facing direction. The sonar system further includes at least one processor and a memory including computer program code configured to, when executed, cause the at least one processor to: receive first sonar return data from the first plurality of sonar transducer elements; receive first facing direction data regarding the first facing direction of the first sonar transducer assembly; and generate a live sonar image of the underwater environment based on the first sonar return data and the first facing direction data. The first plurality of sonar transducer elements are associated with a watercraft on a body of water, wherein the first facing direction is generally outward of the watercraft and is at least partially in a downward direction relative to the watercraft. The first plurality of sonar transducer elements are configured to transmit one or more sonar beams into an underwater environment. The live sonar image provides a continuous front-to-back downward image.

In some embodiments, the continuous front-to-back downward image covers a downward coverage angle that is at least 180 degrees.

In yet another example embodiment, a method of generating a live sonar image of an underwater environment having an expanded coverage volume is provided. The method includes receiving first sonar return data from the first plurality of sonar transducer elements; receiving second sonar return data from the second plurality of sonar transducer elements; receiving first facing direction data regarding the first facing direction of the first sonar transducer assembly; receiving second facing direction data regarding the second facing direction of the second sonar transducer assembly; positioning the first sonar return data based on the first facing direction data to form positioned first sonar return data; positioning the second sonar return data based on the second facing direction data to form positioned second sonar return data; and generating a live sonar image of the underwater environment using the positioned first sonar return data and the positioned second sonar return data.

In some embodiments, the method further comprises causing, on the display, presentation of the live sonar image, wherein the live sonar image provides a continuous front-to-back downward image.

Additional example embodiments of the present invention include methods, systems, apparatuses, and computer program products associated with various embodiments described herein.

BRIEF DESCRIPTION OF THE DRAWINGS

Figure 1:
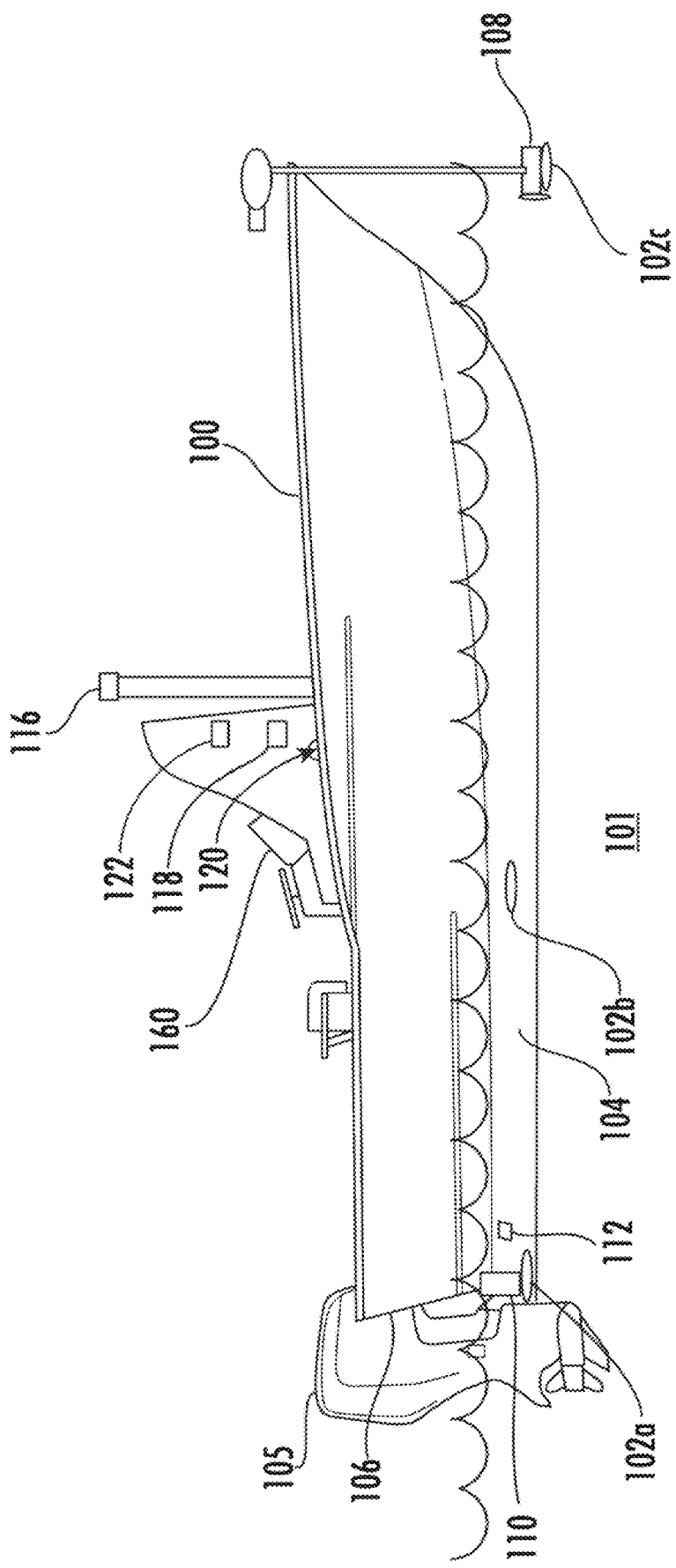
Figure 2A:
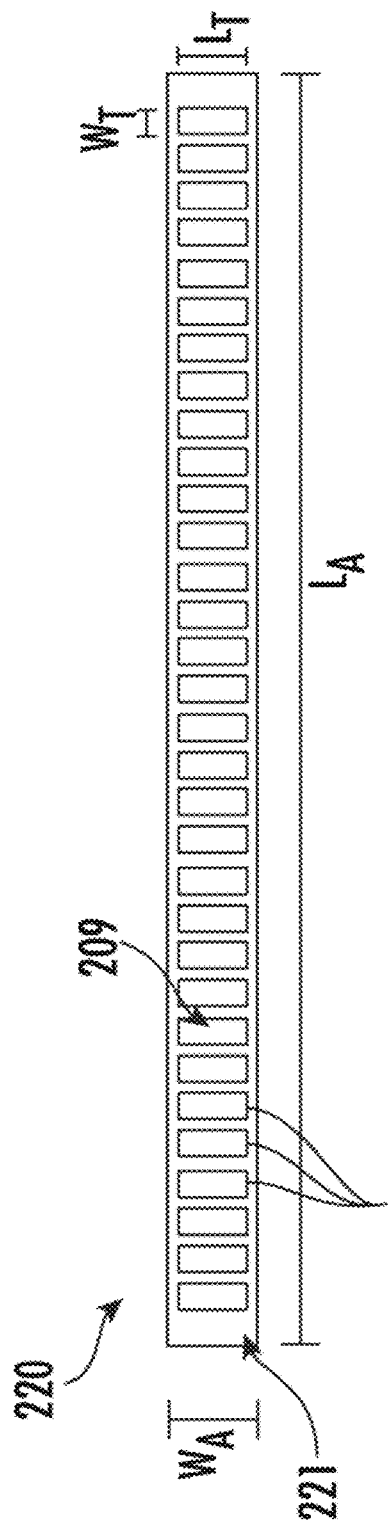
Figure 2B:
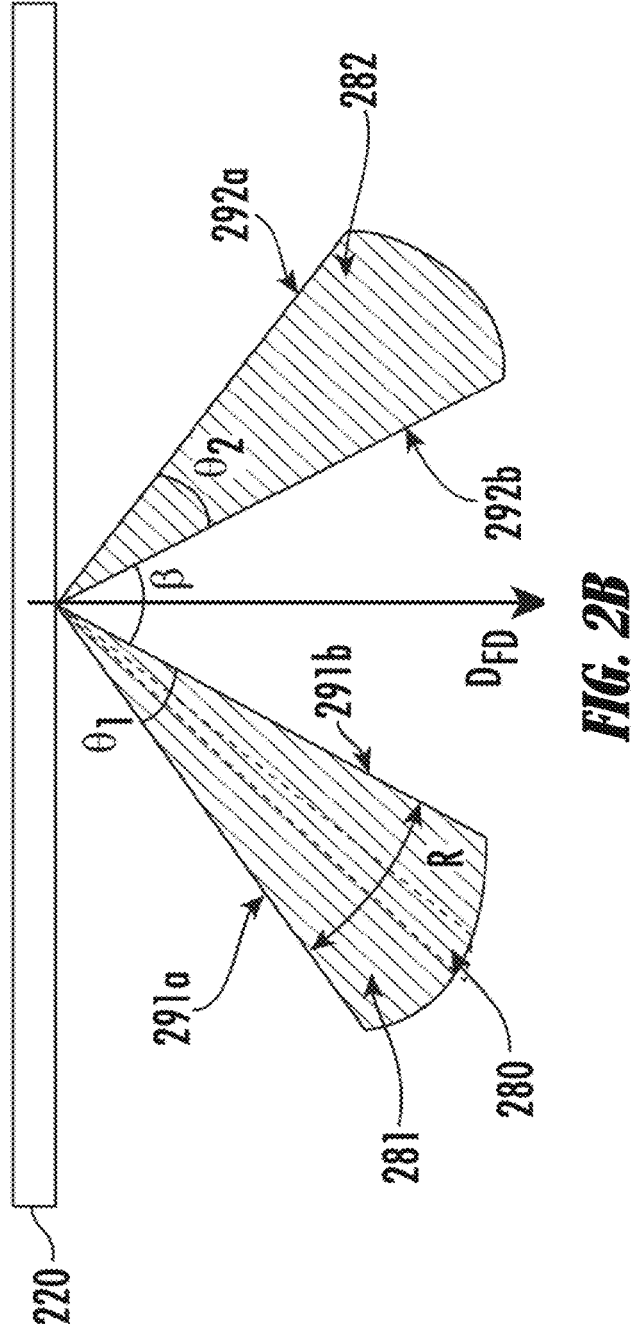
Figure 3:
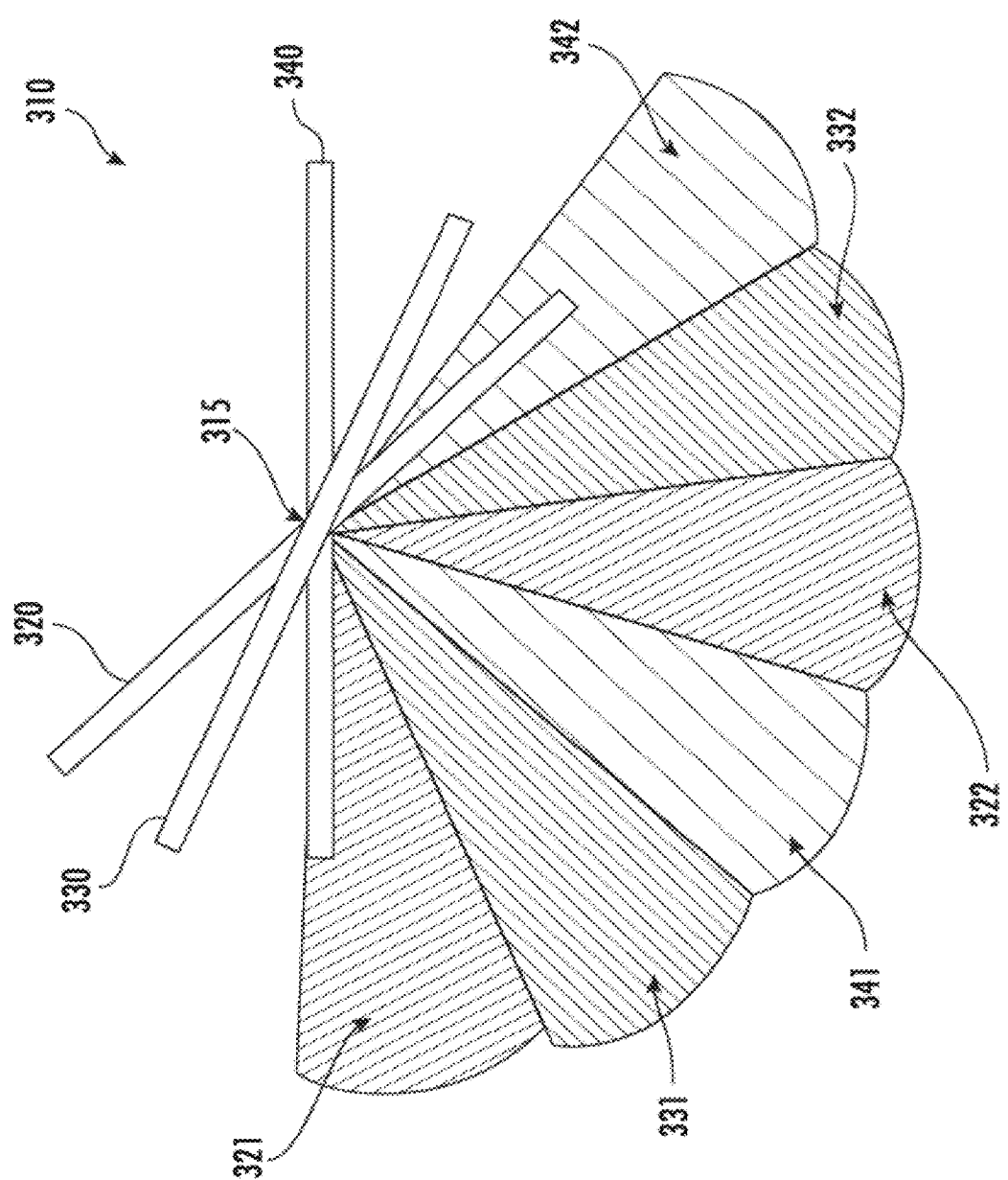
Figure 3A:
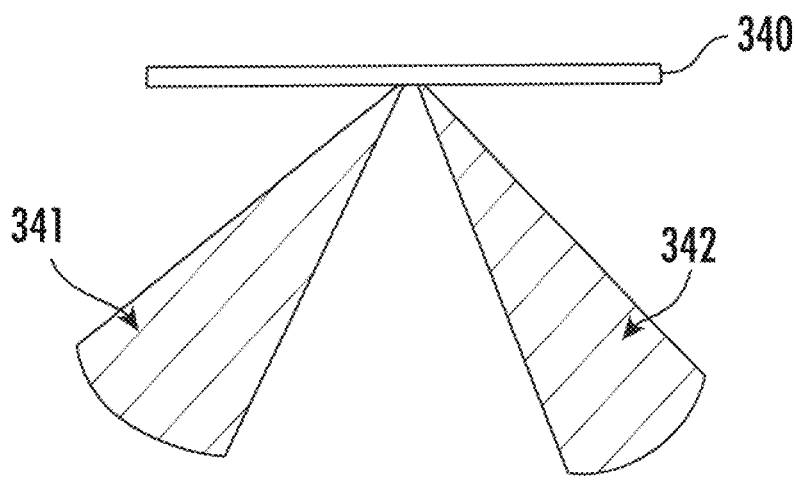
Figure 3B:
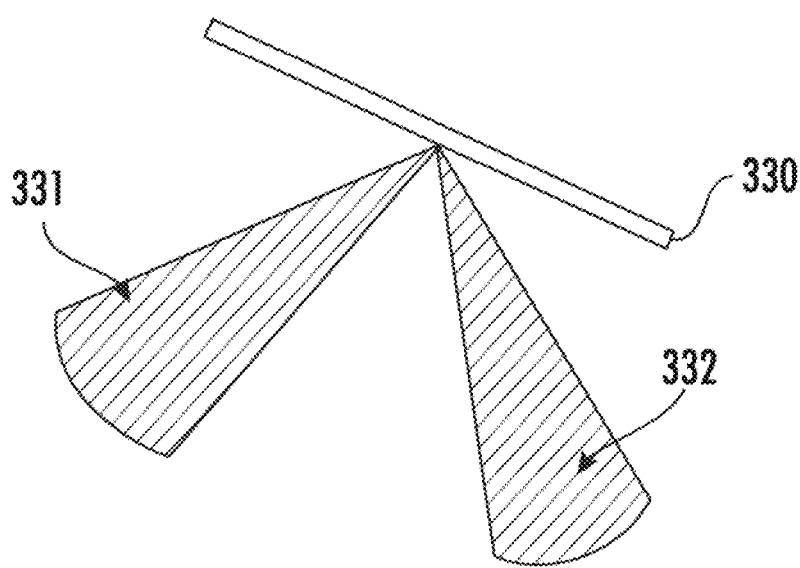
Figure 3C:
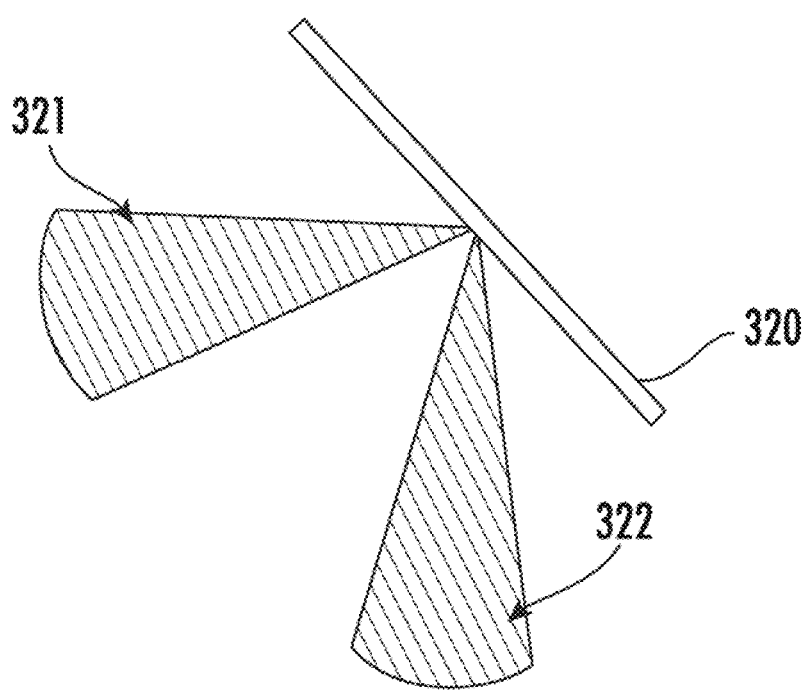
Figure 4:
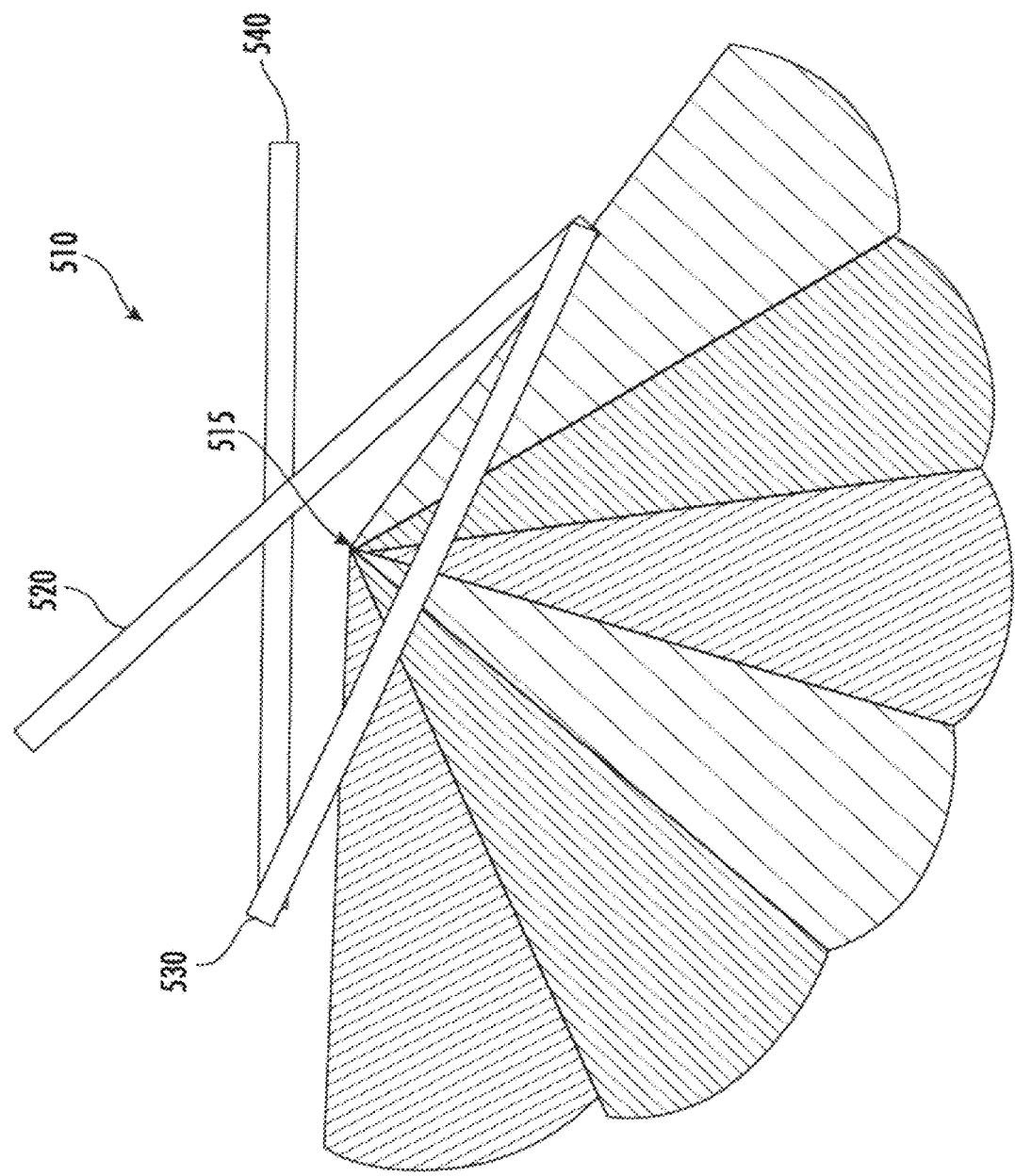
Figure 5:
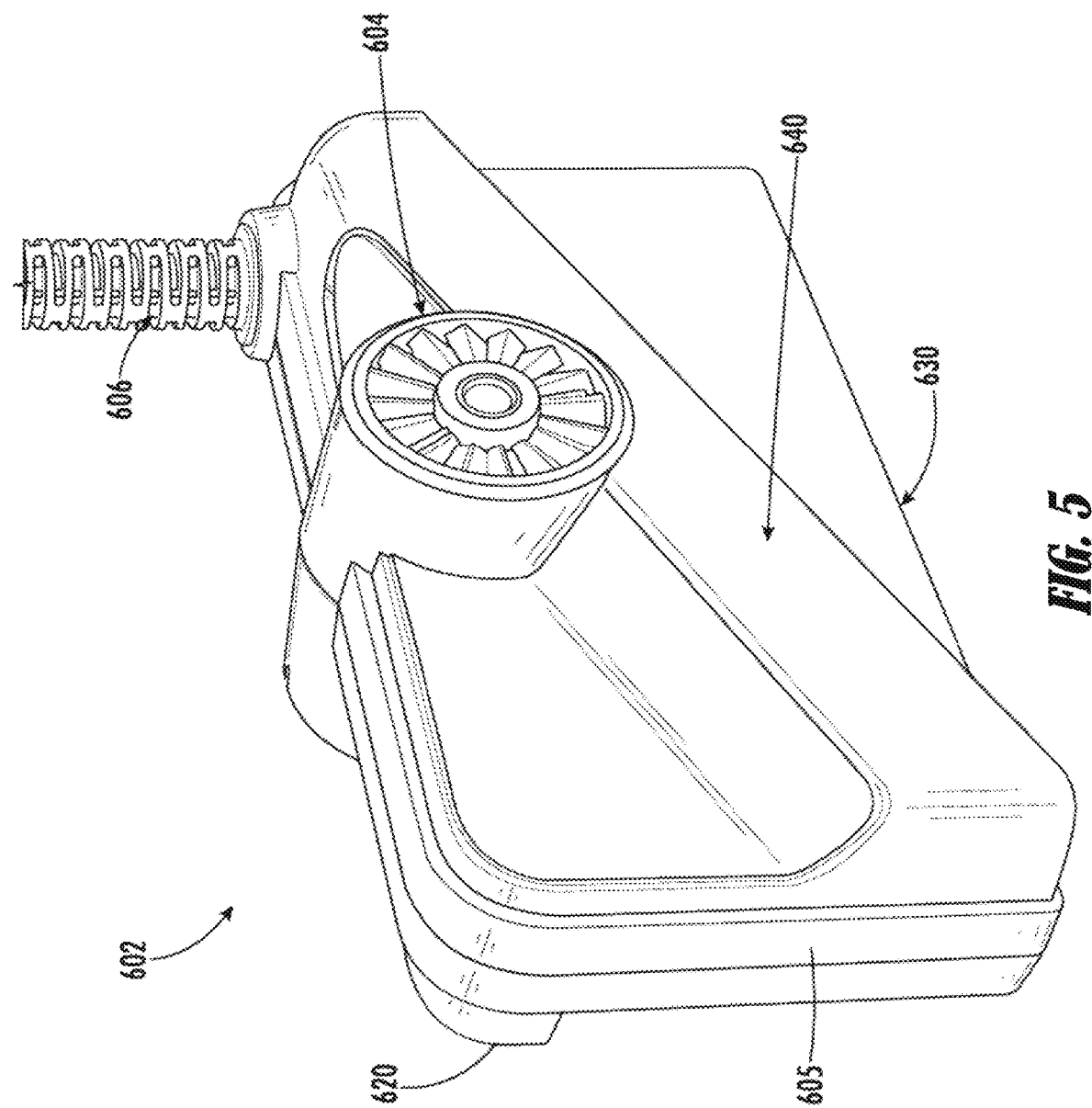
Figure 6:
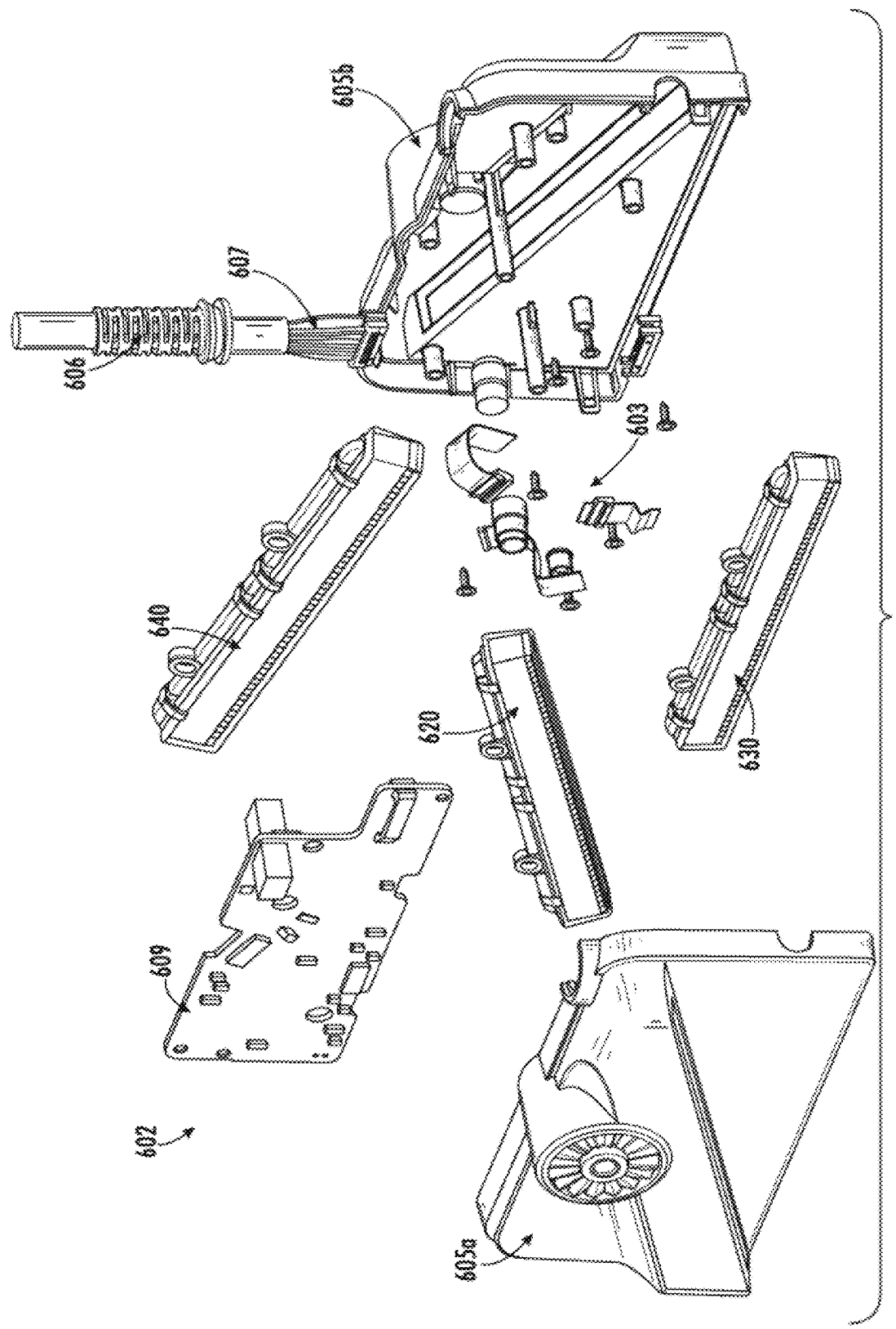
Figure 7A:
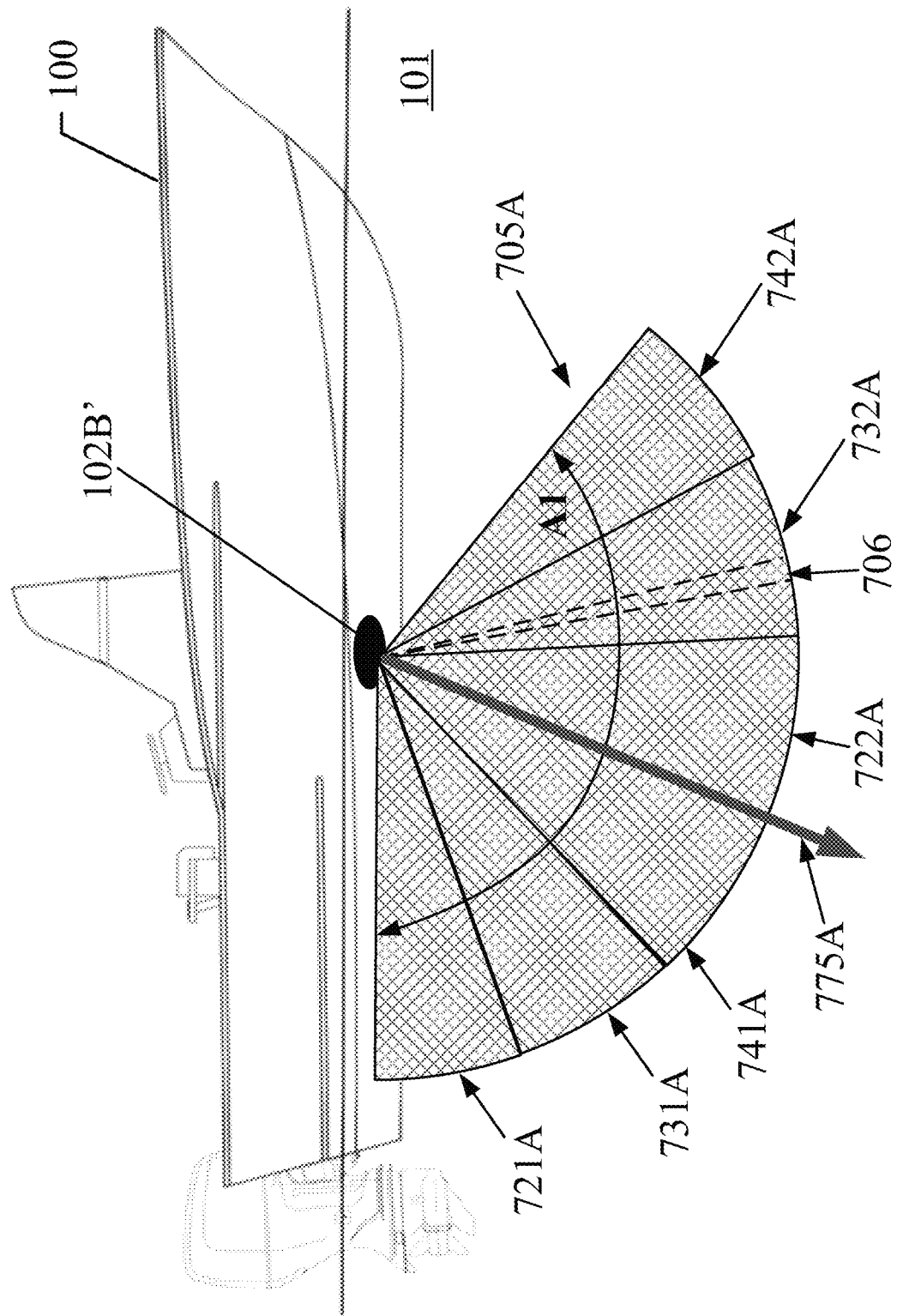
Figure 7B:
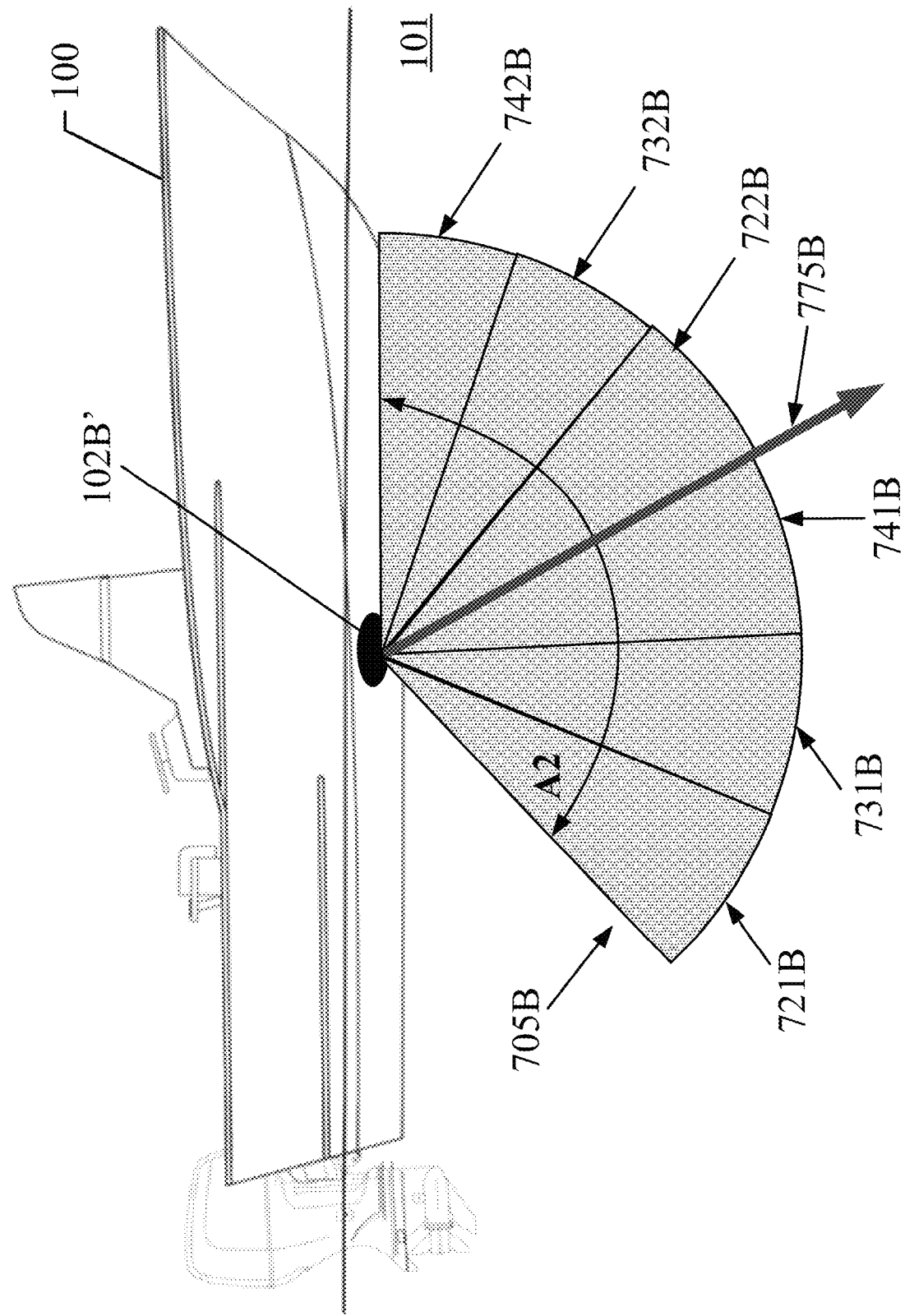
Figure 7C:
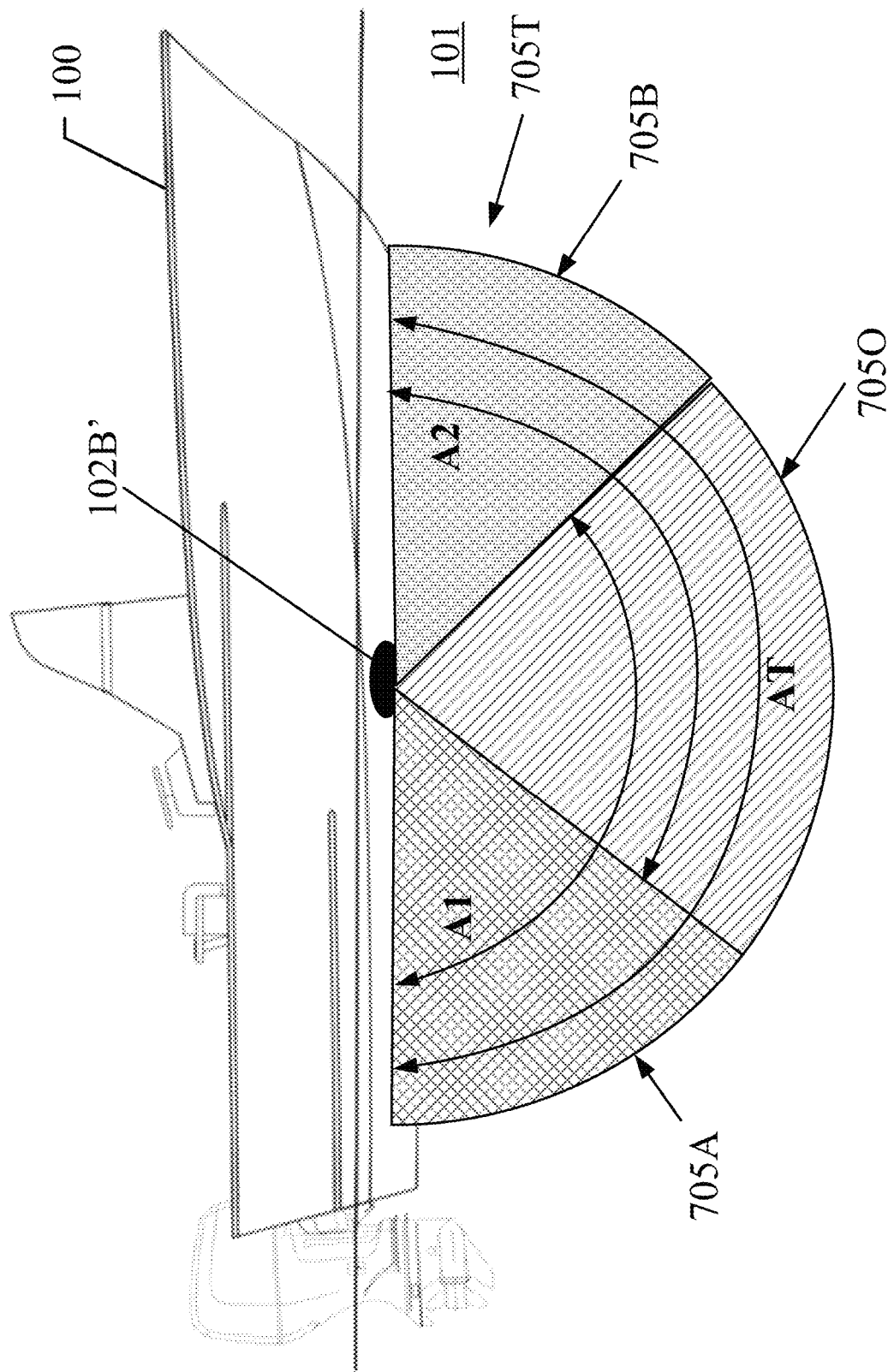
Figure 7E:
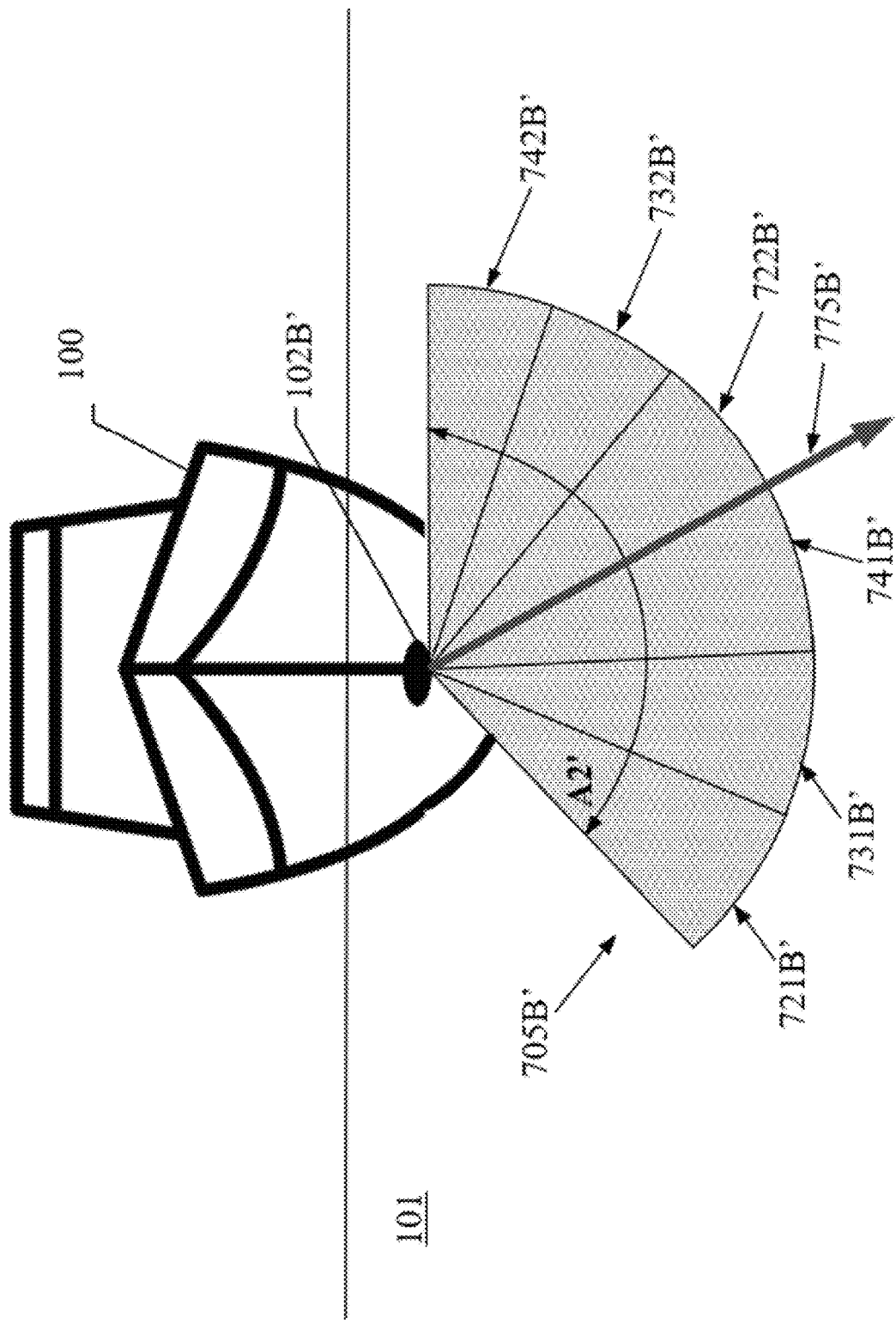
Figure 7F:
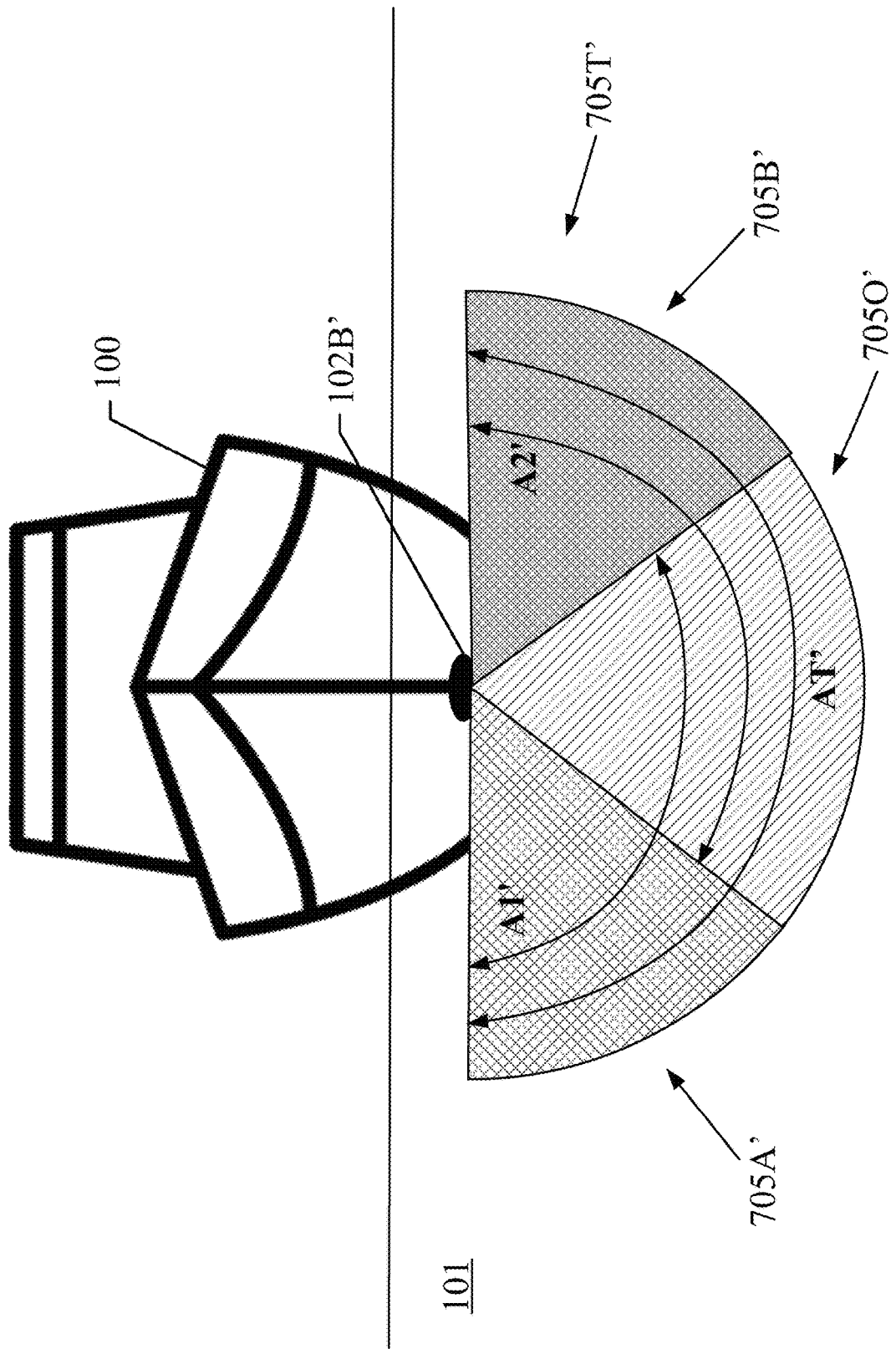
Figure 8B:
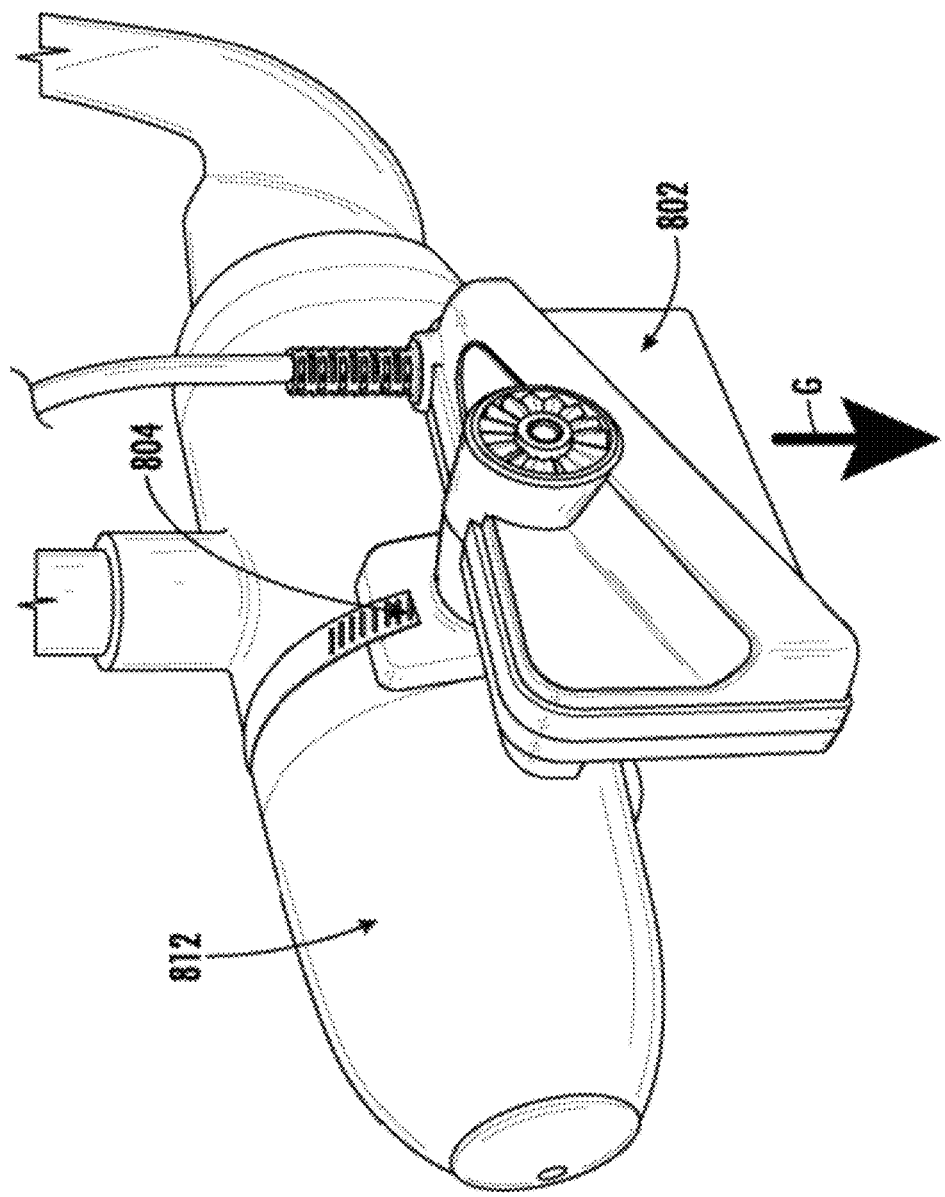
Figure 9A:
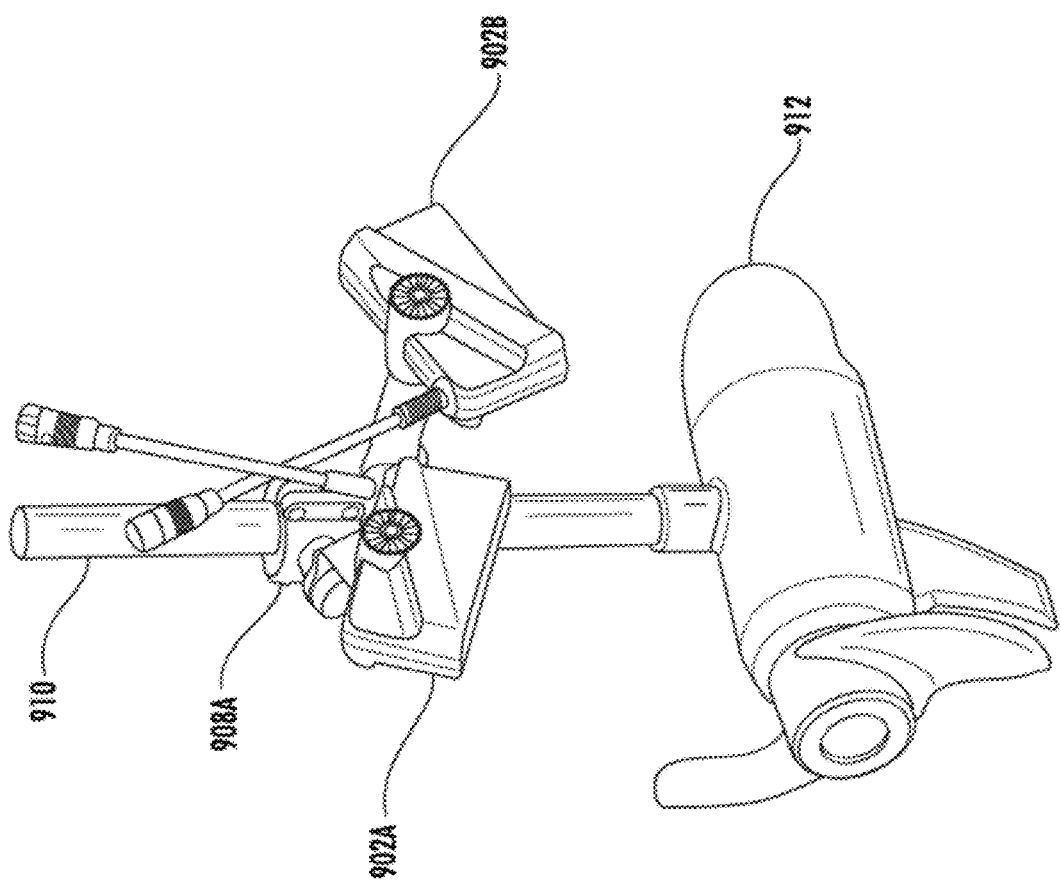
Figure 9B:
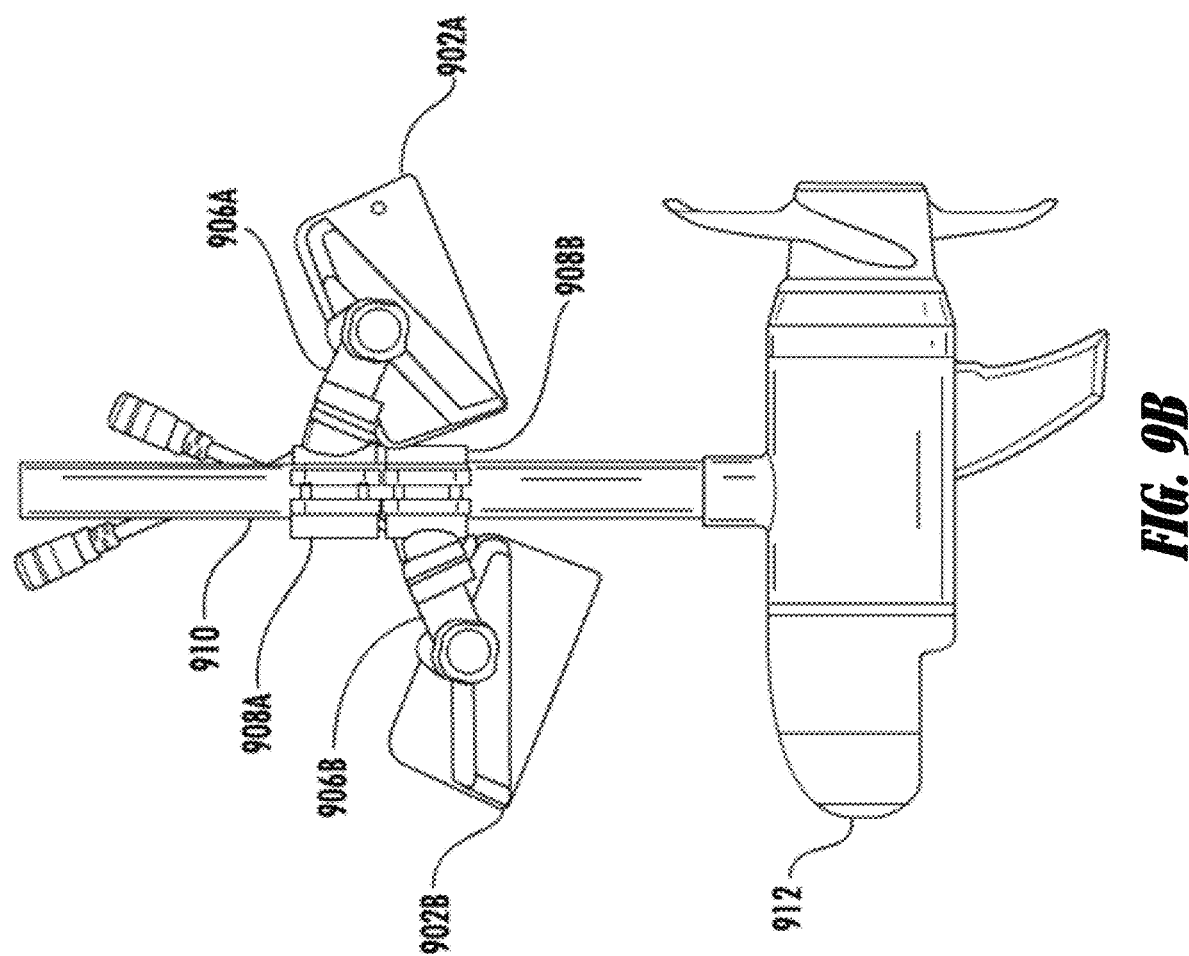
Figure 9D:
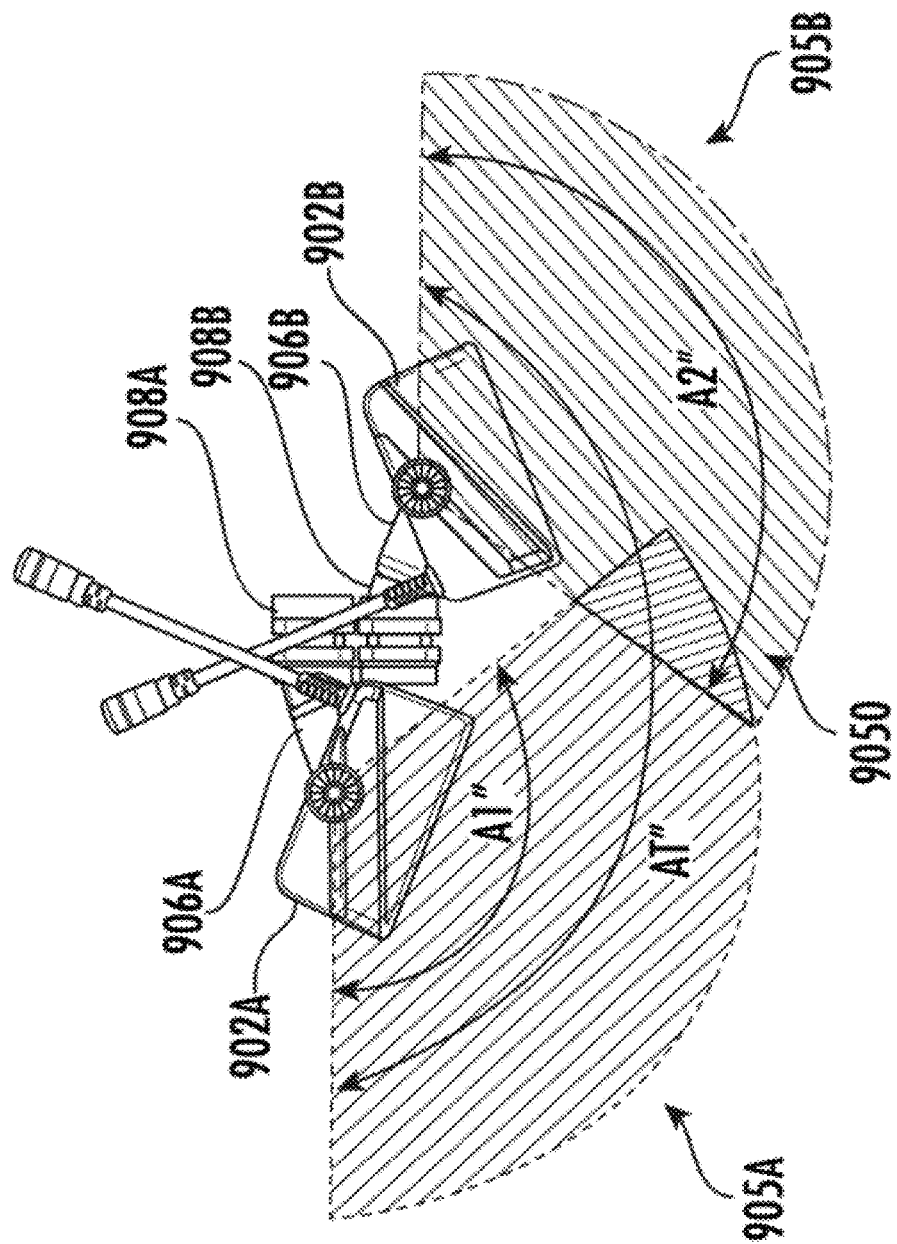
Figure 9E:
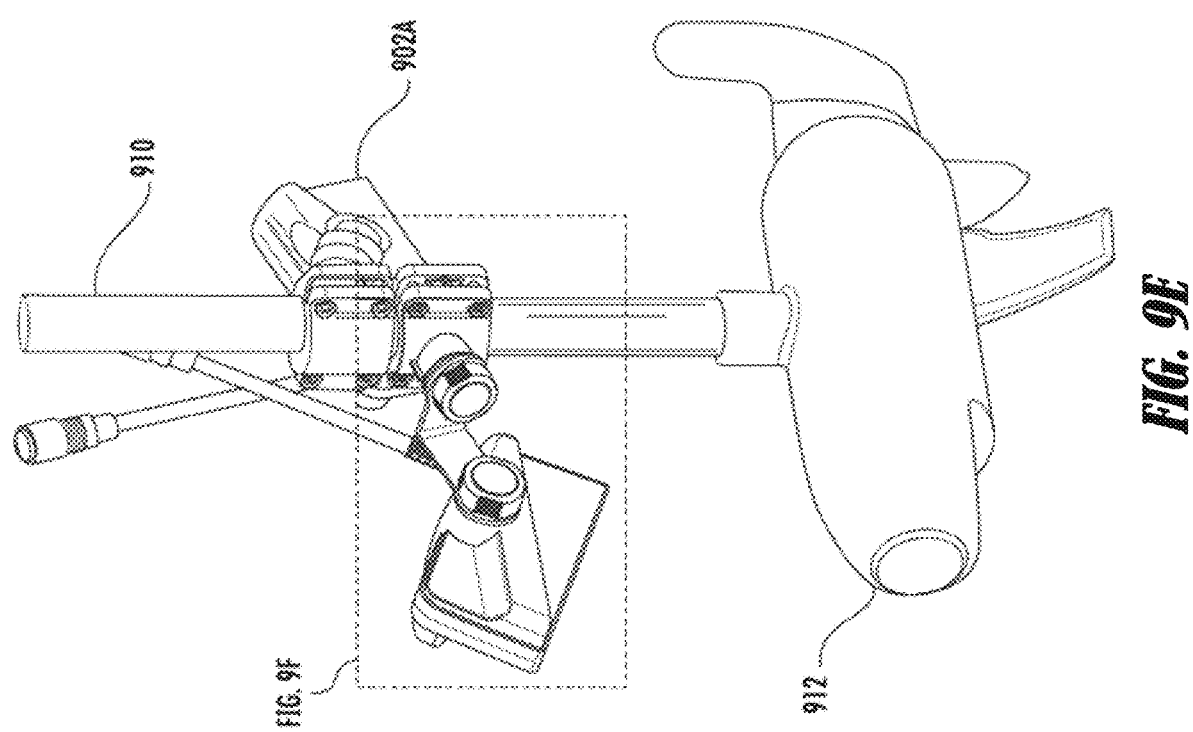
Figure 9F:
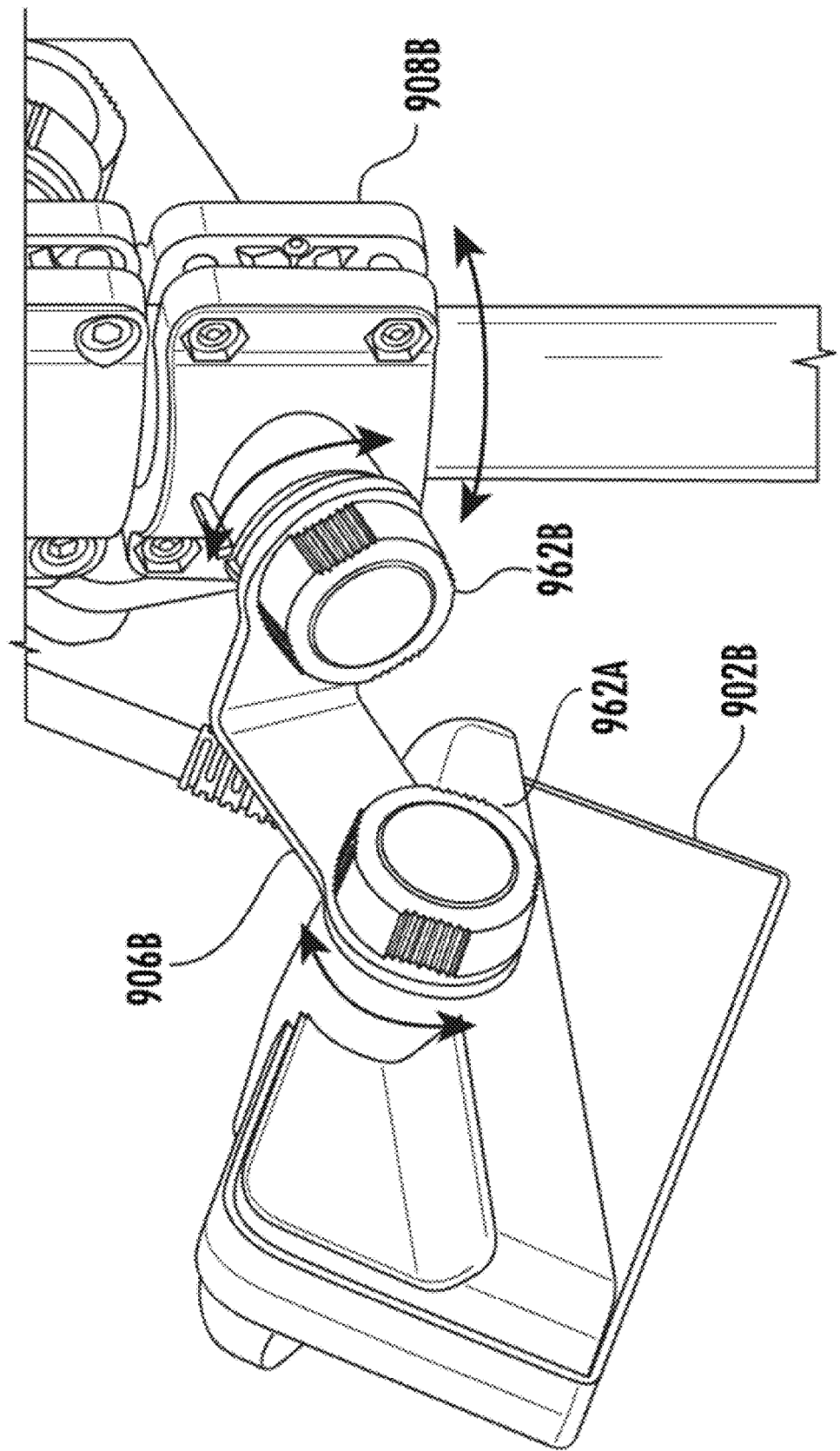
Figure 10A:
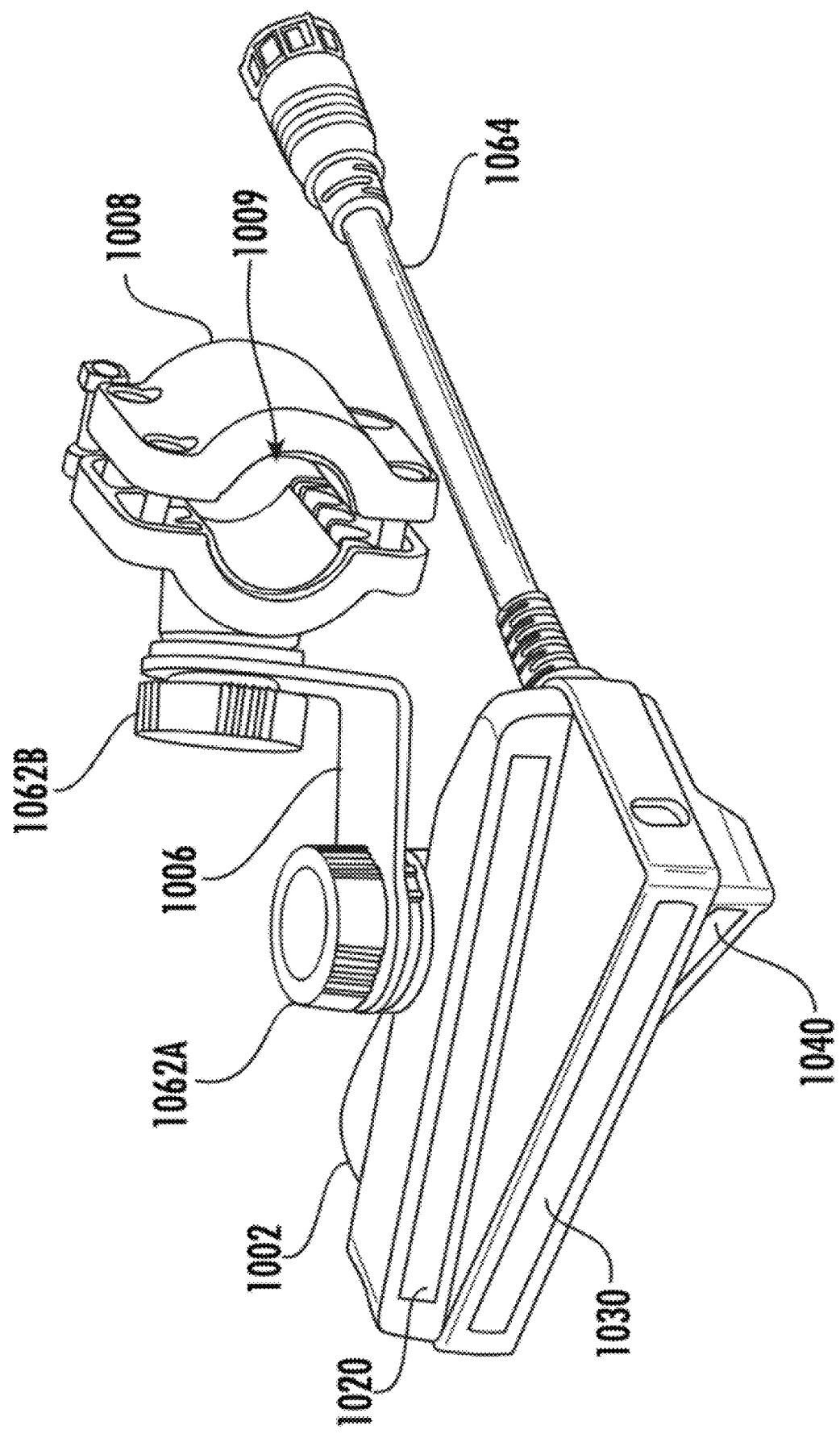
Figure 10B:
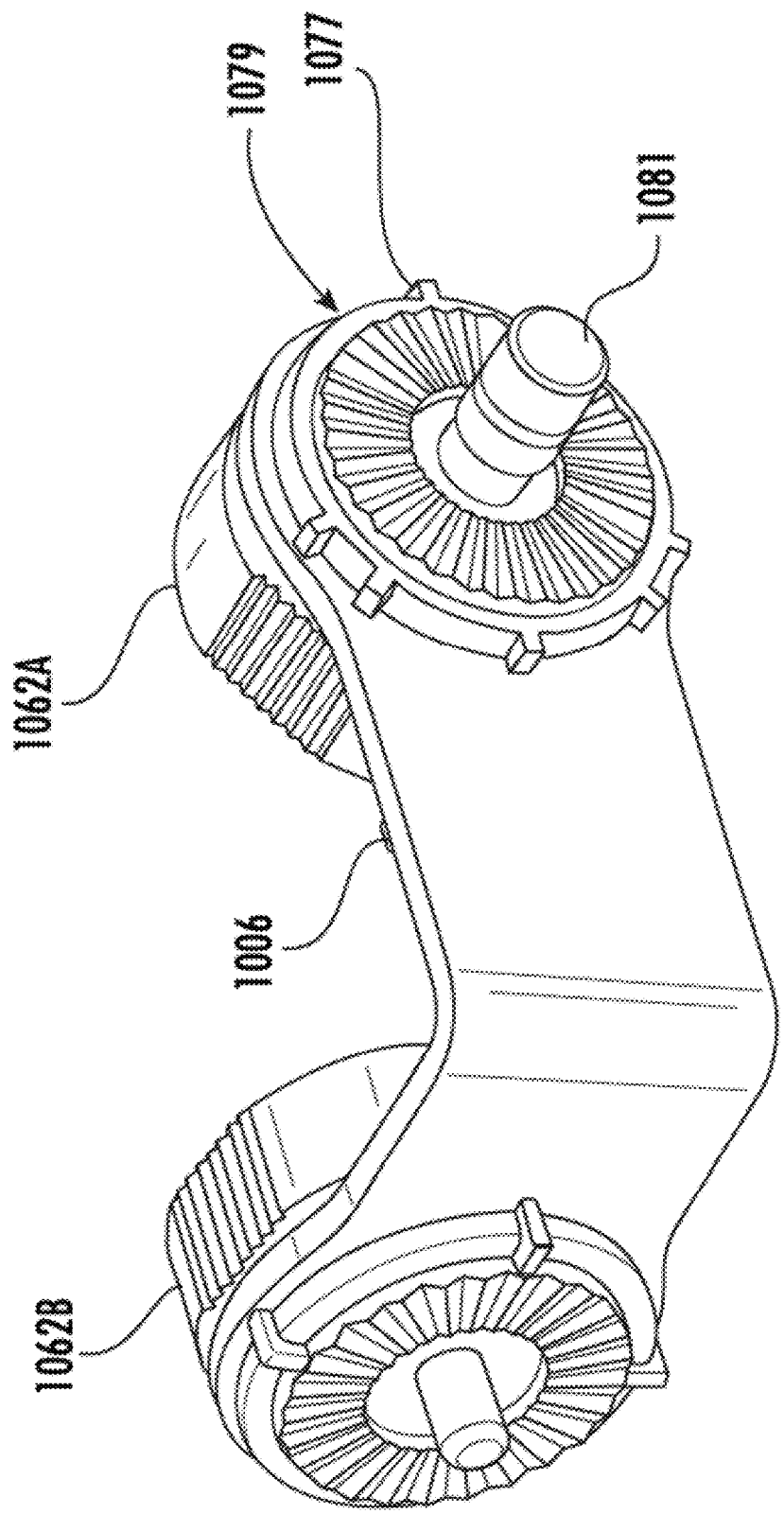
Figure 11:
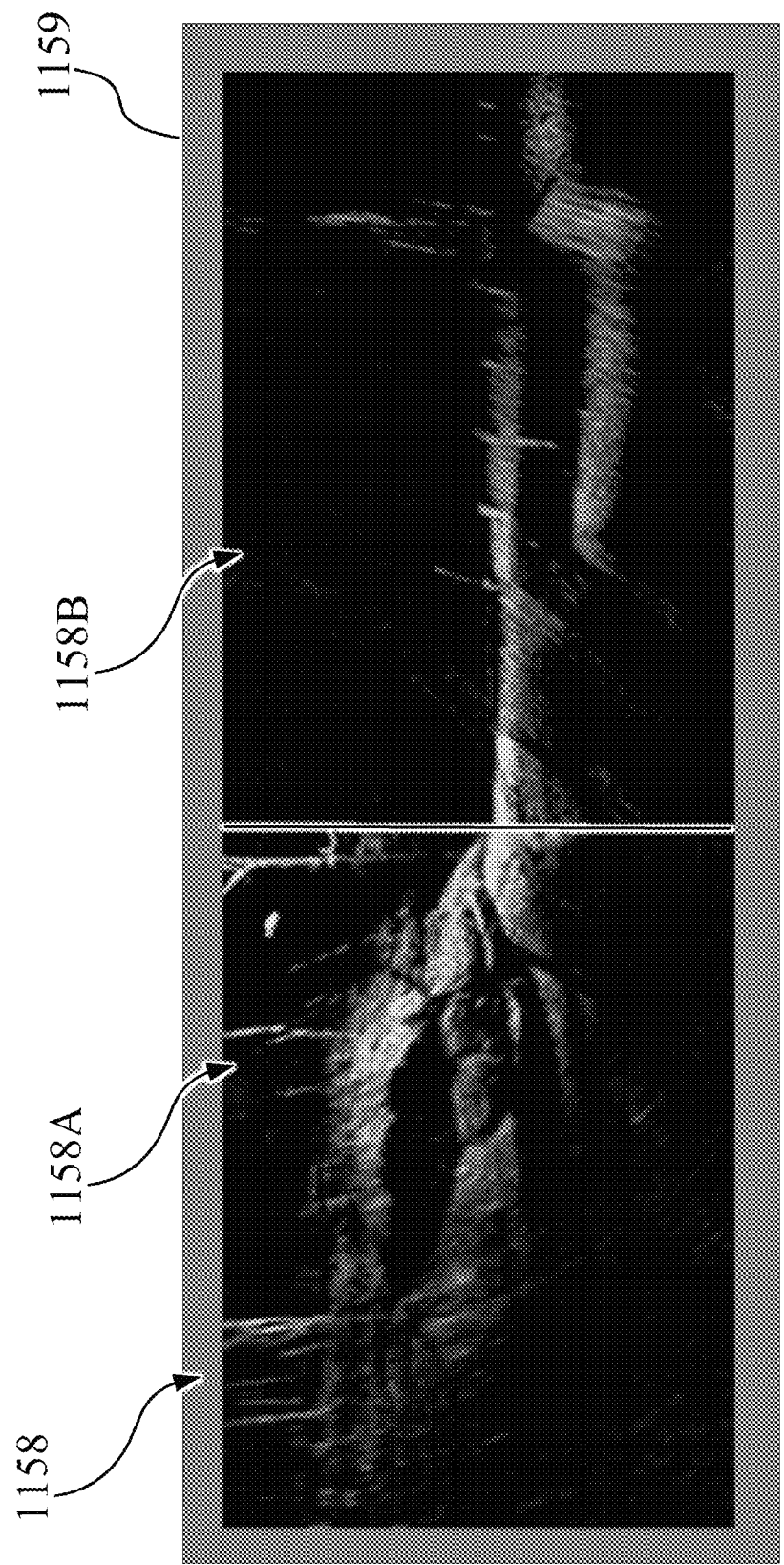
Figure 12:
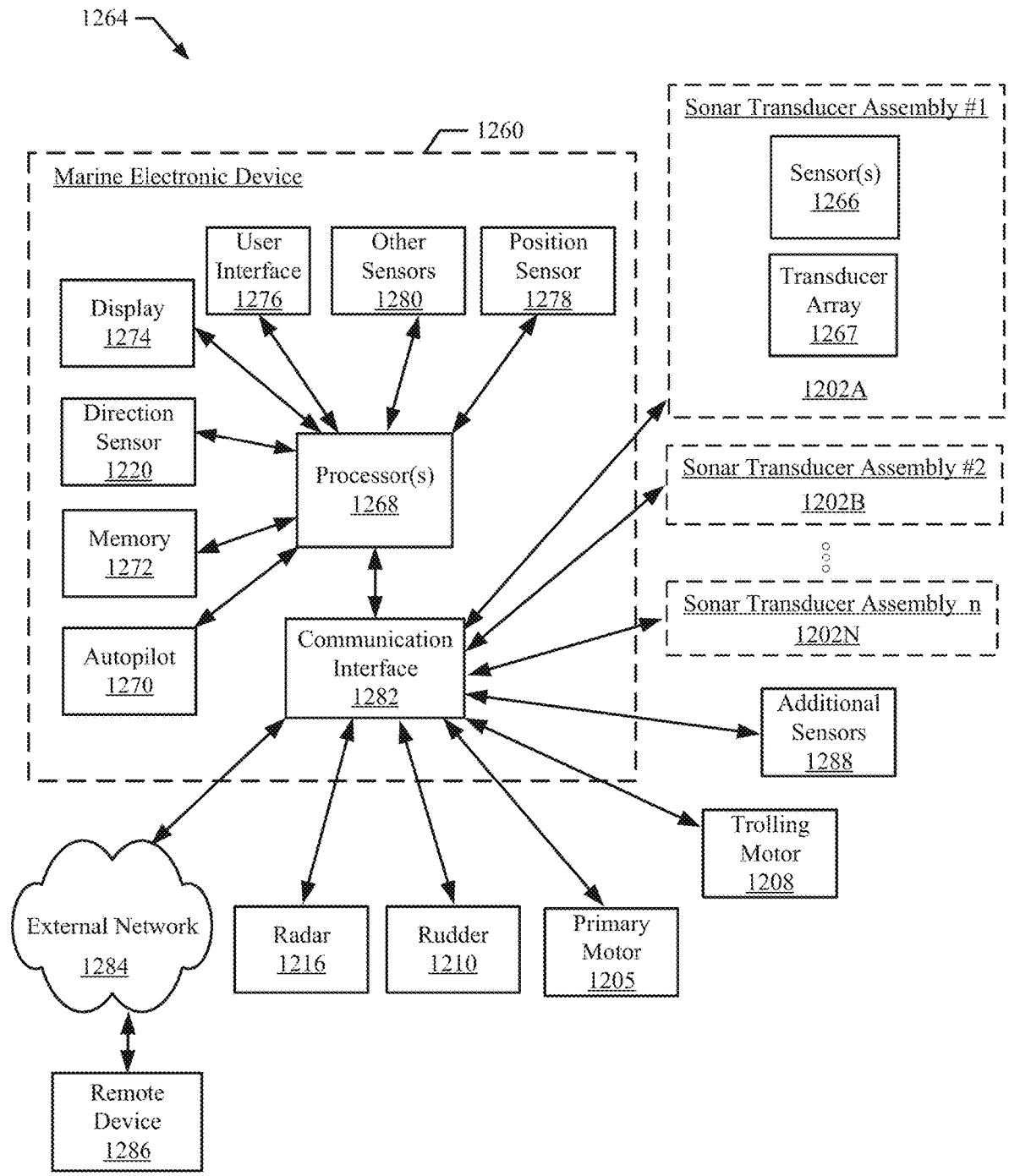
Figure 13:
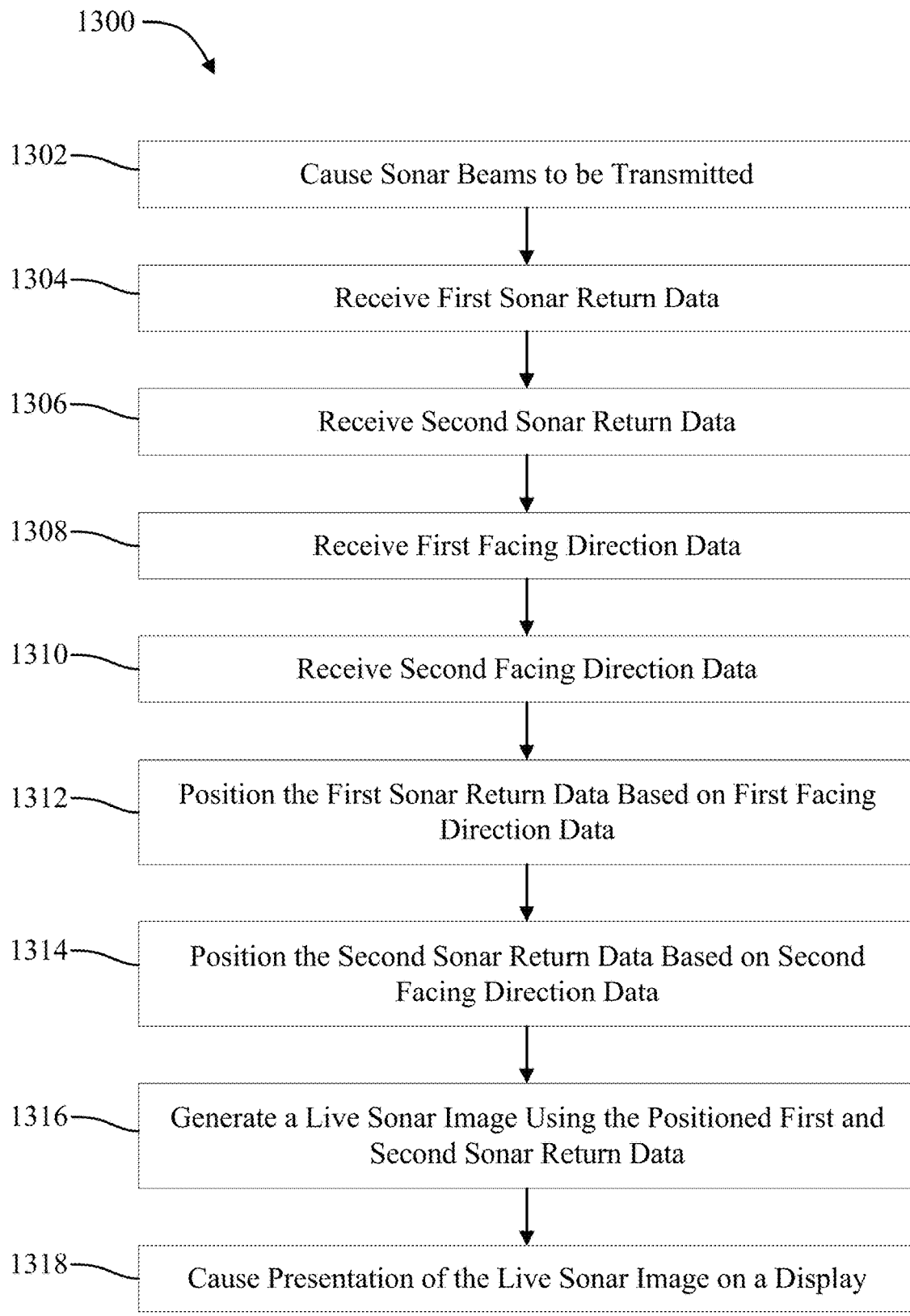

Having thus described the invention in general terms, reference will now be made to the accompanying drawings, which are not necessarily drawn to scale, and wherein:

FIG. 1 illustrates an example watercraft including various marine devices, in accordance with some embodiments discussed herein;

FIG. 2A illustrates an example array of transducer elements, in accordance with some embodiments discussed herein;

FIG. 2B illustrates a side view of the array of transducer elements illustrated in FIG. 2A, wherein an example first range of angles and an example second range of angles for beamformed sonar return beams are illustrated, in accordance with some embodiments discussed herein;

FIG. 2C illustrates an end view of the array of transducer elements illustrated in FIG. 2B along with illustrated ranges of angles of beamformed sonar return beams, in accordance with some embodiments discussed herein;

FIG. 3 illustrates three example arrays arranged to provide continuous sonar coverage utilizing beamformed sonar return beams, in accordance with some embodiments discussed herein;

FIG. 3A illustrates a first array illustrated in FIG. 3 along with its corresponding ranges of angles of beamformed sonar return beams, in accordance with some embodiments discussed herein;

FIG. 3B illustrates a second array illustrated in FIG. 3 along with its corresponding ranges of angles of beamformed sonar return beams, in accordance with some embodiments discussed herein;

FIG. 3C illustrates a third array illustrated in FIG. 3 along with its corresponding ranges of angles of beamformed sonar return beams, in accordance with some embodiments discussed herein;

FIG. 4 illustrates another example arrangement of three example arrays arranged to provide continuous sonar coverage utilizing beamformed sonar return beams, in accordance with some embodiments discussed herein;

FIG. 5 illustrates a perspective view of an example sonar transducer assembly that includes three arrays, in accordance with some embodiments discussed herein;

FIG. 6 illustrates an exploded view of the example sonar transducer assembly shown in FIG. 5, in accordance with some embodiments discussed herein;

FIGS. 7A-7C illustrate schematic side views of a watercraft with example sonar transducer assemblies, wherein the sonar transducer assemblies are mounted generally in a downward direction to provide continuous sonar coverage in the front-to-back direction, in accordance with some embodiments discussed herein;

FIGS. 7D-7F illustrate schematic front views of a watercraft with example sonar transducer assemblies, wherein the sonar transducer assemblies are mounted generally in a downward direction to provide continuous sonar coverage in the side-to-side direction, in accordance with some embodiments discussed herein;

FIGS. 8A-8B illustrate perspective views of example mounting options for an example sonar transducer assembly of FIG. 5 when mounted downwardly, in accordance with some embodiments discussed herein;

FIG. 9A illustrates a perspective view of a sonar system having two sonar transducer assemblies, in accordance with some embodiments discussed herein;

FIG. 9B illustrates a left-side view of the sonar system of FIG. 9A, in accordance with some embodiments discussed herein;

FIG. 9C illustrates a right-side view of the sonar system of FIG. 9A, in accordance with some embodiments discussed herein;

FIG. 9D illustrates a schematic view of the expanded coverage volume generated by the sonar system of FIG. 9A, in accordance with some embodiments discussed herein;

FIG. 9E illustrates another perspective view of the sonar system of FIG. 9A, in accordance with some embodiments discussed herein;

FIG. 9F illustrates an enhanced perspective view of the sonar system of FIG. 9E, in accordance with some embodiments discussed herein;

FIG. 10A illustrates a perspective view of a sonar transducer assembly, a bracket, and a clamp, in accordance with some embodiments discussed herein;

FIG. 10B illustrates a perspective view of an example bracket and other alignment features provided thereon, in accordance with some embodiments discussed herein;

FIG. 11 illustrates an example display presenting a live sonar image, in accordance with some embodiments discussed herein;

FIG. 12 illustrates a block diagram of an example system with various electronic devices, marine devices, and secondary devices shown, in accordance with some embodiments discussed herein; and FIG. 13 illustrates a flow chart with an example method for generating a live sonar image, in accordance with some embodiments discussed herein.

DETAILED DESCRIPTION

Example embodiments of the present invention now will be described more fully hereinafter with reference to the accompanying drawings, in which some, but not all embodiments of the invention are shown. Indeed, the invention may be embodied in many different forms and should not be construed as limited to the example embodiments set forth herein; rather, these embodiments are provided so that this disclosure will satisfy applicable legal requirements. Additionally, any connections or attachments may be direct or indirect connections or attachments unless specifically noted otherwise.

FIG. 1 illustrates an example watercraft 100 including various marine devices, in accordance with some embodiments discussed herein. As depicted in FIG. 1, the watercraft 100 (e.g., a vessel) is configured to traverse a marine environment, e.g. body of water 101, and may use one or more sonar transducer assemblies 102a, 102b, and 102c disposed on and/or proximate to the watercraft. Notably, example watercraft contemplated herein may be surface watercraft, submersible watercraft, or any other implementation known to those skilled in the art. The sonar transducer assemblies 102a, 102b, and 102c may each include one or more transducer elements configured to transmit sound waves into a body of water, receive sonar returns from the body of water, and convert the sonar returns into sonar return data. Various types of sonar transducers may be utilized—for example, a linear downscan sonar transducer, a conical downscan sonar transducer, a sidescan sonar transducer, and/or one or more arrays of a plurality of sonar transducer elements.

In this regard, the sonar transducer may be formed of one or more active elements (e.g., piezoelectric crystals). Wires are soldered to coatings on the active element and can be attached to a cable which transfers the electrical energy from a transmitter to the active element. As an example, when the frequency of the electrical signal is the same as the mechanical resonant frequency of the active element, the active element moves, creating sound waves at that frequency. The shape of the active element determines both its resonant frequency and shape of the sonar beam. Further, padding can be used to prevent sonar emissions from certain faces of the active element (e.g., the top and sides) leaving exposed only the emitting faces for which the sonar beam is desired. Frequencies used by sonar devices vary, and some sonar transducers may produce sonar beams at multiple different frequencies. Some example sonar transducers utilize a frequency range from 50 KHz to over 900 KHz depending on application. Some sonar systems vary the frequency within each sonar pulse using "chirp" technology.

Depending on the configuration, the watercraft 100 may include a primary motor 105, which may be a main propulsion motor such as an outboard or inboard motor. Additionally, the watercraft 100 may include a trolling motor 108 configured to propel the watercraft 100 or maintain a position. The one or more sonar transducer assemblies (e.g., 102a, 102b, and/or 102c) may be mounted in various positions and to various portions of the watercraft 100 and/or equipment associated with the watercraft 100. For example, the sonar transducer assembly may be mounted to the transom 106 of the watercraft 100, such as depicted by sonar transducer assembly 102a. The sonar transducer assembly may be mounted to the bottom or side of the hull 104 of the watercraft 100, such as depicted by sonar transducer assembly 102b. The sonar transducer assembly may be mounted to the trolling motor 108, such as depicted by sonar transducer assembly 102c. Other mounting configurations are contemplated also, such as may enable rotation of the sonar transducer assembly (e.g., mechanical and/or manual rotation, such as on a rod or other mounting connection). In this regard, in some embodiments, the sonar transducer assembly 102c may rotate with the trolling motor shaft. In some embodiments, the sonar transducer assemblies 102a, 102b, 102c may be mounted to one or more steering systems to steer (e.g., rotate) the sonar transducer assemblies relative to the watercraft 100.

The watercraft 100 may also include one or more marine electronic devices 160, such as may be utilized by a user to interact with, view, or otherwise control various functionality regarding the watercraft, including, for example, nautical charts and various sonar systems described herein. In the illustrated embodiment, the marine electronic device 160 is positioned proximate the helm (e.g., steering wheel) of the watercraft 100—although other places on the watercraft 100 are contemplated. Likewise, additionally or alternatively, a remote device (such as a user's mobile device) may include functionality of a marine electronic device.

The watercraft 100 may also comprise other components within the one or more marine electronic devices 160 or at the helm. In FIG. 1, the watercraft 100 comprises a radar 116, which is mounted at an elevated position (although other positions relative to the watercraft are also contemplated). The watercraft 100 also comprises an AIS transceiver 118, a direction sensor 120, and a camera 122, and these components are each positioned at or near the helm (although other positions relative to the watercraft are also contemplated). Additionally, the watercraft 100 comprises a rudder 110 at the stern of the watercraft 100, and the rudder 110 is positioned on the watercraft 100 so that the rudder 110 will rest in the body of water 101. In other embodiments, some of these components may be integrated into the one or more electronic devices 160 or other devices. Another example device on the watercraft 100 includes a temperature sensor 112 that may be positioned so that it will rest within or outside of the body of water 101. Other example devices include a wind sensor, one or more speakers, and various vessel devices/features (e.g., doors, bilge pump, fuel tank, etc.), among other things. Additionally, one or more sensors may be associated with marine devices; for example, a sensor may be provided to detect the position of the primary motor 105, the trolling motor 108, or the rudder 110.

Some example embodiments of the present invention utilize sonar transducer assemblies that provide for generating near real-time (e.g., "live") sonar imagery. In this regard, in some embodiments, the entire sonar image is continuously updated all at once (e.g., as opposed to building up historical slices of sonar data as is typical of conventional downscan or sidescan sonar images). The example sonar transducer assembly described with respect to FIGS. 2A-6 provides an example sonar transducer assembly that can be used to form the live sonar imagery. Notably, however, other sonar transducer assembly configurations can also be used to form live sonar imagery, and embodiments of the present invention are not necessarily meant to be limited to a specific sonar transducer assembly. For example, more or less arrays or elements within the arrays may be used, different transducer element configurations may be used, multiple sonar transducer assemblies can be used, etc.

FIGS. 2A-2C illustrate an example array 220 of transducer elements 208 that may be utilized with various embodiments of the present invention, such as within an example sonar transducer assembly described herein. In some embodiments, the transducer array 220 may include a plurality of transducer elements 208 arranged in a line and electrically connected relative to each other. For example, the transducer elements 208 may be individually positioned on a printed circuit board (PCB). The PCB may mechanically support and electrically connect the electronic components, including the transducer elements using conductive tracks (e.g. traces), pads, and other features. The conductive tracks may comprise sets of traces; for example, each transducer element may be mounted to the PCB such that the transducer element is in electrical communication with a set of traces. Each transducer element, sub-array, and/or the array of transducer elements may be configured to transmit one or more sonar pulses and/or receive one or more sonar return signals. Unless otherwise stated, although FIGS. 2A-2C illustrate a linear array with transducer elements of a certain shape, different types of arrays (or sub-arrays), transducer elements, spacing, shapes, etc. may be utilized with various embodiments of the present invention.

In the illustrated embodiment shown in FIG. 2A, the transducer array 220 includes an emitting face 221 with a length $L_A$ and a width $W_A$, where the length $L_A$ is greater than the width $W_A$. Within the array 220, each transducer element 208 defines an emitting face 209 with a length $L_T$ and a width $W_T$, where the length $L_T$ is greater than the width $W_T$. The length $L_T$ of each transducer element 208 is perpendicular to the length $L_A$ of the emitting face 221. Each transducer element 208 is spaced at a predetermined distance from an adjacent transducer element, which may be designed based on desired operating characteristics of the array 220, such as described herein.

In some embodiments, the array 220 of transducer elements 208 is configured to operate to transmit one or more sonar beams into the underwater environment. Depending on the configuration and desired operation, different transmission types of sonar beams can occur. For example, in some embodiments, the array 220 may transmit sonar beams according to a frequency sweep (e.g., chirp sonar) so as to provide sonar beams into the underwater environment. In some embodiments, the array 220 may be operated to frequency steer transmitted sonar beams into various volumes of the underwater environment. In some embodiments, the array 220 may be operated to cause a broadband transmit sonar beam to be sent into the underwater environment. Depending on the frequency used and phase shift applied between transducer elements, different volumes of the underwater environment may be targeted.

In some embodiments, the array 220 may be configured to receive sonar return signals. The way the sonar return signals are received and/or processed may vary depending on the desired sonar system configuration. FIGS. 2B-2C illustrate the array 220 with example possible sonar return beam coverage according to various example embodiments. In this regard, in some embodiments, each of the plurality of transducer elements are configured to operate at a fixed phase shift (e.g., at one of 0 radians, π/2 radian, π/4 radian, or π/8 radian) and vary in frequency (e.g., between 500 kHz-1200 kHz). This processing approach beamforms multiple sonar return beams (e.g., beam 280) between a first range of angles ($\theta_1$) 281 and between a second range of angles ($\theta_2$) 282. To explain, the sonar returns may be received by the array 220 and filtered into frequency bins based on the frequency of the signal. From that, sonar return beams 280 can be determined that provide sonar returns within a small angle window (e.g., 0.5 degrees to 1 degrees, although greater or lesser angle windows are contemplated). Since the mounting orientation with respect to the watercraft can be known, and the frequency is known, then the relative angle with respect to the waterline (or other reference) can be determined and used to form sonar imagery, as described herein.

With further reference to FIG. 2B, the sonar return beams (e.g., 280) can be "steered" (e.g., along arrow R) within the first range of angles 281 based on varying the frequency (e.g., between 291a and 291b). Likewise, the sonar return beams can be "steered" within the second range of angles 282 based on varying the frequency (e.g., between 292a and 292b). By operating the transducer elements at a fixed phase shift, the two range of angles 281, 282 can be covered with sonar beams, but there is also a gap (e.g., indicated by the range of angles ($\theta_3$) that is not able to be covered by the frequency steered sonar return beams.

Without being bound by theory, a perhaps simplified explanation of this can be based on considering a single beam shape that is formed by a receipt event of the array. The beam shape is formed of a rather wide main beam lobe, along with at least one relatively small defined side lobe (e.g., the beam 280) that extends outwardly therefrom. By operating at a fixed phase shift and ignoring the main beam lobe, the sonar return signals received within the side lobe MAY be determined. Further, changing the frequency causes a shifting of the direction of the side lobe among the range of angles (281 or 282). Since the side lobe is symmetrical about the main lobe, there are two ranges of angles that are symmetrical about the facing direction DFD of the emitting face 221 of the array 220.

Further information regarding beamforming, including frequency steered beamforming, can be found, for example, in the following: U.S. Pat. No. RE45,379, entitled "Frequency Division Beamforming for Sonar Arrays"; U.S. Pat. No. 10,114,119, entitled "Sonar Systems using Interferometry and/or Beamforming for 3D Imaging"; U.S. Pat. No. 9,739,884, entitled "Systems and Associated Methods for Producing a 3D Sonar Image"; and U.S. patent application Ser. No. 16/382,639, published as U.S. Publication No. 2019/0265354, and entitled "Sonar Transducer Having Geometric Elements"; the contents of each hereby being incorporated by reference in their entireties.

Depending on various factors, different beam shapes can be achieved and different ranges of angles can be achieved. The following describes some example factors that can be varied to effect the beam shapes and different ranges of angles: the number of transducer elements, the size/shape of the transducer elements, the size/shape of the array, the fixed phase shift, the frequency range, among other things. An example embodiment produces a first range of angles spanning ~22.5 degrees and a second range of angles spanning ~22.5 degrees with a gap of range of angles of ~45 degrees therebetween. Additionally, sonar return beams of ~0.25 degrees to 2 degree are formed. Further, with reference to FIG. 2C, a transverse beamwidth $\theta_3$ of ~20 degrees is formed (although other transverse beamwidths are contemplated such as between ~9 degrees and 27 degrees). Some example embodiments that may achieve such example beam shapes include an array length of between ~100-150 millimeters; an array width of between ~3-10 millimeters; an array thickness of between ~1-3 millimeters; a number of transducer elements of between 50-200 millimeters; a width of the transducer element of between ~0.4-1 millimeters; and a length of the transducer element of between ~2-10 millimeters (although outside of these ranges is also contemplated).

In some embodiments, the system may be configured to utilize more than one array, where the arrays are oriented relative to each other to increase coverage volume of the underwater environment. For example, in some embodiments, a second (or more) array(s) can be added and tilted relative to the first array such that the gap within the first array is "covered" by one or more of the range of angles of sonar return beams from such array(s). FIG. 3 illustrates an example three array assembly 310 that is designed to provide continuous sonar coverage utilizing beamformed sonar return beams. The sonar assembly 310 includes a first array 340, a second array 330, and a third array 320. The first array 340 (shown by itself in FIG. 3A), is oriented with a facing direction (e.g., substantially straight down relative to the figure) so as to produce a first range of angles 341 and a second range of angles 342 (with a gap in between). The second array 330 (shown by itself in FIG. 3B), is oriented with a facing direction at an angle (e.g., −22.5 degrees relative to the facing direction of the first array 340) so as to produce a first range of angles 331 and a second range of angles 332 (with a gap in between). The third array 320 (shown by itself in FIG. 3C), is oriented with a facing direction at another angle (e.g., −45 degrees relative to the facing direction of the first array 340) so as to produce a first range of angles 321 and a second range of angles 322 (with a gap in between). As so arranged, the gaps between each set of the two range of angles are covered by a range of angles from each of the other two arrays. The illustrated example thus provides continuous sonar beam coverage for −135 degrees, although other overall coverage angles are contemplated such as angles ranging from 90 degrees-140 degrees.

FIG. 4 illustrates another example sonar transducer assembly 510 that includes an arrangement of three arrays arranged to provide continuous sonar coverage utilizing beamformed sonar return beams. Notably, while the first array 540 and the third array 520 are mounted and oriented similarly to the first and third arrays of the sonar transducer assembly 310 of FIG. 3, the second array 530 of the sonar transducer assembly 510 has been shifted (e.g., offset) while maintaining its relative angle orientation (e.g., it is still mounted with a facing direction at an angle (e.g., 22.5 degrees) relative to the facing direction of the first array— just as in the sonar transducer assembly 310). Thus, the sonar transducer assembly 510 forms an "X" configuration for the first array 540 and the third array 520, but also has a line " " at the bottom of the "X" corresponding to the second array 530. Notably, the same relative continuous sonar beam coverage is obtained (e.g., as the small relative shift from the centerpoint 315 in FIG. 3 does not significantly change the resulting beam coverage— particularly with respect to the distance covered in the underwater environment). For explanatory purposes, the various ranges of angles are shown extending from a slightly revised centerpoint 515.

FIG. 5 illustrates an example sonar transducer assembly 602 including a housing 605 that houses the three arrays 620, 630, 640 (which are illustrated in exploded view in FIG. 6). Notably, the housing 605 includes one or more mounting features (e.g., a ratchet-type mounting feature 604 for enabling secured attachment in different orientations). The cable 606 provides a safe channel for running various wires 607 used in conjunction with the arrays. Notably, the X-plus-line configuration of the arrays enables some benefits for the sonar transducer assembly 602. For example, the housing 605 of the sonar transducer assembly 602 may maintain a small footprint and still provide a straight bottom that enables a user to more easily comprehend the position of the center array (and, thus, determine and orient the sonar transducer assembly 602 properly with respect to the watercraft for the desired coverage). With reference to FIG. 6, the PCB 609 and the electrical connectors 603 are also shown for electrically connecting the arrays 620, 630, and 640.

Though shown mounted in FIGS. 3 and 4 so that the resulting sonar coverage is forward (left side) and downward, with the wide beam angle of ~135 degrees extending in the vertical plane, other orientations are contemplated. For example, in some embodiments, the sonar transducer assembly may be oriented in a generally horizontal direction to cause the wide beam angle (e.g., −135 degrees) to extend in a generally horizontal plane, such as may correspond with the water surface. Such an orientation provides a wider live sonar image in the horizontal plane extending from the watercraft and may be preferred for understanding positions of objects within the water (e.g., cast the fishing line 5 degrees off the bow on the starboard side) and/or distances of objects from the watercraft (e.g., the fish school is 15 feet from the watercraft).

FIGS. 7A-7C illustrate schematic side views of a watercraft 100 with example sonar transducer assemblies where the sonar transducer assemblies are mounted generally in a downward direction to provide continuous sonar coverage in the front-to-back direction. In the illustrated embodiment in FIGS. 7A-7C, a first sonar transducer assembly 902A (see FIG. 9A) and a second sonar transducer assembly 902B (see FIG. 9A) are provided at position 102B'.

Looking first at FIG. 7A, sonar coverage for a first sonar transducer assembly 902A is illustrated. The first sonar transducer assembly 902A may utilize three arrays to provide continuous sonar coverage 705A downwardly in the rear direction relative to the watercraft 100 (e.g., from front to back). In this regard, the three arrays work together to provide corresponding ranges of angles 721A, 722A, 731A, 732A, 741A, 742A— similar to those shown and described with respect to FIG. 4. In the illustrated embodiments, the lengths of each of the emitting faces of the three arrays extend in the front-to-back direction of the watercraft 100. As indicated herein, the frequency of the sonar return beams can be varied to provide a sonar return beam 706 that can sweep within the continuous sonar coverage 705A (e.g., across the three arrays) — to capture sonar return signals along the sonar beam coverage. With such an example set-up, the resulting two-dimensional live sonar image would show a live (or near real-time) sonar image corresponding to the volume extending underneath the watercraft according to the beam coverage (although in some embodiments the first sonar transducer assembly 902A may have a facing direction that is different and/or rotatable with respect to the watercraft).

In the illustrated embodiment, the first sonar transducer assembly 902A provided at position 102B' possesses a first facing direction 775A, and this first facing direction 775A is in a downward direction and towards the back of the watercraft 100. The continuous sonar coverage 705A generated by the first sonar transducer assembly 902A may generate a coverage angle (A1). This coverage angle (A1) may possess a variety of values. For example, the coverage angle (A1) may be at least 90 degrees, at least 120 degrees, or at least 135 degrees. In the illustrated embodiment, the coverage angle (A1) is 135 degrees.

Looking now at FIG. 7B, sonar coverage for a second sonar transducer assembly 902B (see FIG. 9A) is illustrated. The second sonar transducer assembly 902B may be provided at position 102B', and the second sonar transducer assembly 902B may operate similarly to the first sonar transducer assembly 902A. However, the second sonar transducer assembly 902B may possess a second facing direction 775B that is in a downward direction and towards the front of the watercraft 100, and this may generate continuous sonar coverage 705B as illustrated in FIG. 7B with various ranges of angles 721B, 722B, 731B, 732B, 741B, 742B being combined to form continuous sonar coverage 705B. This second facing direction 775B may be made different from the first facing direction 775A of the first sonar transducer assembly 902A. By doing this, the continuous sonar coverage 705A, 705B of the two sonar transducer assemblies may be differentiated so that the overall coverage angle (AT) (e.g., a downward coverage angle) generated by the sonar transducer assemblies may be increased as is illustrated in FIG. 7C.

In the illustrated embodiment of FIG. 7B, the continuous sonar coverage 705B generated by the second sonar transducer assembly may generate a coverage angle (A2). This coverage angle (A2) may possess a variety of values. For example, the coverage angle (A2) may be at least 90 degrees, at least 120 degrees, or at least 135 degrees. In the illustrated embodiment, the coverage angle (A2) is 135 degrees. The coverage angle (A2) is equal to the coverage angle (A1) in the illustrated embodiment, but these coverage angles may be different in other embodiments.

Looking now at FIG. 7C, the operation of the first sonar transducer assembly 902A and the second sonar transducer assembly 902B together is illustrated. A first sonar transducer assembly 902A may provide continuous sonar coverage 705A spanning a coverage angle (A1), and a second sonar transducer assembly 902B may provide continuous sonar coverage 705B spanning a coverage angle (A2). Together, the first and second sonar transducer assembly may provide continuous sonar coverage 705T having an overall coverage angle (AT). The overall coverage angle (AT) may be increased relative to the coverage angle (A1) by itself. The overall coverage angle (AT) may also be increased relative to the coverage angle (A2) by itself.

In some embodiments, the overall coverage angle (AT) of the first sonar transducer assembly and the second sonar transducer assembly may be at least 140 degrees. Additionally, in some embodiments, the overall coverage angle (AT) of the first sonar transducer assembly and the second sonar transducer assembly may be at least 150 degrees. Furthermore, the overall coverage angle (AT) of the first sonar transducer assembly and the second sonar transducer assembly may be at least 180 degrees in some embodiments. In the illustrated embodiment in FIG. 7C, the overall coverage angle (AT) provides over 180 degrees of continuous front-to-back downward coverage. However, the facing directions of sonar transducer assemblies may be adjusted to increase the coverage angle (AT) so that the sonar coverage extends up to the water surface.

As illustrated in FIG. 7C, the continuous sonar coverage 705A generated by the first sonar transducer assembly 902A and the continuous sonar coverage 705B generated by the second sonar transducer assembly 902B may overlap to form an overlap volume 7050. Where the first sonar transducer assembly 902A and the second sonar transducer assembly 902B are positioned such that an overlap volume 7050 is formed, sonar return data may be processed in different ways. For example, sonar return data from only one of the first sonar transducer assembly 902A or the second sonar transducer assembly 902B may be used in the overlap volume, and sonar return data from the other sonar transducer assembly may be ignored. This may be done, in some embodiments, after analyzing the quality of the sonar return data from each sonar transducer assembly in some embodiments, and the sonar return data having the highest quality may be utilized. Alternatively, sonar return data from both the first sonar transducer assembly and the second sonar transducer assembly may be utilized in the overlap volume 7050. This may be done by utilizing the sonar return data from the first sonar transducer assembly 902A for some portion of the overlap volume 7050 and by utilizing the sonar return data from the second sonar transducer assembly 902B for the remaining portion of the overlap volume 7050. Alternatively, sonar return data from both sonar transducer assemblies may be used at the same locations within the overlap volume 7050.

FIGS. 7D-7F illustrate schematic front views of a watercraft with example sonar transducer assemblies where the sonar transducer assemblies are mounted generally in a downward direction to provide continuous sonar coverage in the side-to-side direction. In the illustrated embodiment, a first sonar transducer assembly 902A (see FIG. 9A) and a second sonar transducer assembly 902B (see FIG. 9A) are provided at position 102B'. These sonar transducer assemblies may generally operate in a similar manner as the sonar transducer assemblies discussed in reference to FIGS. 7A-7C, but the sonar transducer assemblies of FIGS. 7D-7F may have different facing directions so that the generated continuous sonar coverage is made different.

Looking now at FIG. 7D, sonar coverage for a first sonar transducer assembly 902A (see FIG. 9A) is illustrated. The first sonar transducer assembly 902A (see FIG. 9A) may utilize three arrays to provide continuous sonar coverage 705A' downwardly and towards the right relative to forward direction of the watercraft 100. In this regard, the three arrays work together to provide corresponding ranges of angles 721A', 722A', 731A', 732A', 741A', 742A'— similar to those shown and described with respect to FIG. 4. In the illustrated embodiments, the lengths of each of the emitting faces of the three arrays extend in the side-to-side direction of the watercraft 100. The first sonar transducer assembly 902A will have a first facing direction 775A' and will generate continuous sonar coverage 705A' having a coverage angle (A1').

Turning now to FIG. 7E, sonar coverage for a second sonar transducer assembly 902B (see FIG. 9B) is illustrated. The second sonar transducer assembly 902B may utilize three arrays to provide continuous sonar coverage 705B' downwardly and towards the left relative to forward direction of the watercraft 100. In this regard, the three arrays work together to provide corresponding ranges of angles 721B', 722B', 731B', 732B', 741B', 742B'— similar to those shown and described with respect to FIG. 4. In the illustrated embodiments, the lengths of each of the emitting faces of the three arrays extend in the side-to-side direction of the watercraft 100. The second sonar transducer assembly 902B will have a second facing direction 775B' and will generate continuous sonar coverage 705B' having a coverage angle (A2').

Looking now at FIG. 7F, the operation of the first sonar transducer assembly 902A and the second sonar transducer assembly 902B together is illustrated. A first sonar transducer assembly 902A may provide continuous sonar coverage 705A' spanning a coverage angle (A1'), and a second sonar transducer assembly 902B may provide continuous sonar coverage 705B' spanning a coverage angle (A2'). Together, the first and second sonar transducer assemblies may provide continuous sonar coverage 705T' having an overall coverage angle (AT') (e.g., a downward coverage angle). This overall coverage angle (AT') may be increased relative to the coverage angle (A1') by itself. This overall coverage angle (AT') may also be increased relative to the coverage angle (A2') by itself.

In some embodiments, the overall coverage angle (AT') of the first sonar transducer assembly 902A and the second sonar transducer assembly 902B may be at least 140 degrees. Additionally, in some embodiments, the overall coverage angle (AT') of the first sonar transducer assembly 902A and the second sonar transducer assembly 902B may be at least 150 degrees. Furthermore, the overall coverage angle (AT') of the first sonar transducer assembly 902A and the second sonar transducer assembly 902B may be at least 180 degrees in some embodiments. In the illustrated embodiment in FIG. 7F, the overall coverage angle (AT') provides 180 degrees of continuous side-to-side downward coverage. However, the facing directions of sonar transducer assemblies may be adjusted to increase the coverage angle (AT') so that the sonar coverage extends to the water surface.

As illustrated in FIG. 7F, the continuous sonar coverage 705A' generated by the first sonar transducer assembly 902A and the continuous sonar coverage 705B' generated by the second sonar transducer assembly 902B may overlap to form an overlap volume 7050'. As discussed elsewhere herein, sonar return data may be processed in different ways where an overlap volume 7050' is present.

FIGS. 7A-7F illustrate some example orientations of sonar transducer assemblies contemplated herein. Notably, however, such sonar transducer assemblies may be mounted in other directions with respect to the watercraft (e.g., other angles than besides front-to-back or side-to-side). Along similar lines, such sonar transducer assemblies may be mounted so as to be able to rotate relative to the watercraft (and generate sonar coverage volumes in many different directions relative to the watercraft). For example, the sonar transducer assembly could be mounted to a trolling motor shaft or other shaft that is configured to rotate relative to the watercraft. In this regard, any example rotatable mounting is contemplated for various sonar transducer assemblies (e.g., a steering system may be employed with any mounting option such as, for example, the trolling motor steering system or another steering system).

Sonar transducer assemblies may be mounted in a variety of ways. FIGS. 8A-8B illustrate example mounting orientations for the sonar transducer assembly 602 illustrated in FIG. For example, FIG. 8A illustrates a similar sonar transducer assembly 802 mounted to a pole 810 (e.g., a shaft of a trolling motor) using a bracket 806. The bracket 806 attaches via a fastener to the sonar transducer assembly 802 at a first end 807 and to the pole 810 via a clamp 808 at a second end 805. The bracket 806 includes a bend that enables the sonar transducer assembly 802 to be spaced from the pole 810 and oriented as desired (e.g., facing generally horizontally along arrow G). Additionally, FIG. 8B illustrates an example where the sonar transducer assembly 802 is mounted to the trolling motor housing 812 via a strap and clamp 804. The sonar transducer assembly 802 may be oriented as desired (e.g., having a facing direction (G) that is generally in the downward direction).

Multiple sonar transducer assemblies may be used in some embodiments to obtain the desired increased sonar coverage volume. FIGS. 9A-9C illustrate various views of a sonar system having two sonar transducer assemblies oriented so that the sonar transducer assemblies generally have a downward facing direction. FIG. 9A illustrates a perspective view of the sonar system, FIG. 9B illustrates a left-side view of the sonar system of FIG. 9A, and FIG. 9C illustrates a right-side view of the sonar system of FIG. 9A.

As illustrated in FIG. 9A, the system may position a first sonar transducer assembly 902A and a second sonar transducer assembly 902B. The first sonar transducer assembly 902A is positioned on a first bracket 906A. The first bracket 906A is attached to the first clamp 908A, and the first clamp 908A may be configured to be attached to an object by receiving the object in an internal volume 1009 (see FIG. 10A) of the first clamp 908A. Additionally, the second sonar transducer assembly 902B is positioned on a second bracket 906B. The second bracket 906B is attached to the second clamp 908B, and the second clamp 908B may be configured to be attached to an object by receiving the object in an internal volume 1009 (see FIG. 10A) of the second clamp 908B. In the illustrated embodiment, the first clamp 908A and the second clamp 908B are attached to a pole 910 (e.g., shaft) connected to a trolling motor housing 912, and the pole 910 is received in the internal volume 1009 (see FIG. 10A) of the first clamp 908A and the second clamp 908B.

FIG. 9D illustrates a schematic view of the expanded coverage volume generated by the sonar system of FIGS. 9A-9C. The first sonar transducer assembly 902A may generate continuous sonar coverage 905A with a coverage angle (A1″), and the second sonar transducer assembly 902B may generate continuous sonar coverage 905B with a coverage angle (A2″). Together, the first sonar transducer assembly 902A and the second sonar transducer assembly 902B generate a combined continuous sonar coverage, and this combined continuous sonar coverage may effectively have an overall coverage angle (AT″). This overall coverage angle (AT″) may be at least 180 degrees in some embodiments, and an example of this is illustrated in FIG. 9D. Furthermore, the continuous sonar coverage 905A of the first sonar transducer assembly 902A and the continuous sonar coverage 905B of the second sonar transducer assembly 902B may overlap to form an overlap volume 9050. As discussed herein, sonar return data may be processed in different ways to generate sonar images for locations within the overlap volume 9050.

Various alignment features may be utilized to assist in positioning the sonar transducer assemblies to adjust the facing direction of the sonar transducer assemblies. FIG. 9E illustrates a perspective view of the sonar system of FIG. 9A, and FIG. 9F illustrates an enhanced perspective view of the sonar system of FIG. 9E where certain features may be more clearly seen.

Looking at FIG. 9F, the second sonar transducer assembly 902B is illustrated. Alignment features may be provided in the form of a second bracket 906B and a second clamp 908B. The second sonar transducer assembly 902B may be attached to a second bracket 906B, and the second bracket 906B may be used to assist in attaching the second sonar transducer assembly 902B to the second clamp 908B and the pole 910 (see FIG. 9A). As illustrated by the arrows, the position of the second sonar transducer assembly 902B may be changed in a variety of ways. For example, the second sonar transducer assembly 902B may be rotated relative to the second bracket 906B, the second bracket 906B may be rotated relative to the clamp 908B to generate rotation of the second sonar transducer assembly 902B, or the second clamp 908B may be rotated relative to the pole 910 (see FIG. 9A) to generate rotation of the second sonar transducer assembly 902B. As illustrated in FIG. 9F, knobs 962A, 962B may be provided as an alignment feature to assist in positioning the sonar transducer assemblies. The knobs 962A, 962B may be rotatable in some embodiments to selectively prevent or permit rotation of the second sonar transducer assembly 902B and/or the second bracket 906B.

Further alignment features are illustrated in FIGS. 10A and 10B. FIG. 10A illustrates a perspective view of a sonar transducer assembly, a bracket, and a clamp. FIG. 10B illustrates a perspective view of an example bracket and other alignment features provided thereon.

Looking first at FIG. 10A, a sonar transducer assembly 1002 is illustrated. This sonar transducer assembly 1002 has a first array 1020 with a first plurality of sonar transducer elements, a second array 1030 having a second plurality of sonar transducer elements, and a third array 1040 having a third plurality of sonar transducer elements. The sonar transducer assembly 1002 may also have a cable 1064 connected thereto to provide power to the sonar transducer assembly 1002, to transfer data to the sonar transducer assembly 1002, and/or to receive data from the sonar transducer assembly 1002. Alignment features are provided in the form of a bracket 1006, a clamp 1008, a first knob 1062A, and a second knob 1062B. The clamp 1008 defines an internal volume 1009 where a pole 910 (see FIG. 9A) or some other object may be received.

Turning now to FIG. 10B, further alignment features on the bracket 1006 itself are illustrated. First knobs 1062A and second knobs 1062B are provided. These knobs 1062A, 1062B may be rotatable and may be integrally connected to a bar 1081 that may be received in a portion of a sonar transducer assembly. Additionally, the bracket 1006 may include one or more protrusions 1077, and these protrusions 1077 are configured to assist a user in positioning a sonar transducer assembly at a desired angular orientation on the bracket. For example, the sonar transducer assembly may be aligned with one of the protrusions 1077 to generate a desired facing direction for the sonar transducer assembly. Another alignment feature on the bracket 1006 is the patterned surface 1079. The patterned surface 1079 may include a plurality of elevated regions and depressed regions, and the patterned surface 1079 may be configured to assist with positioning of a sonar transducer assembly, to assist in retaining the sonar transducer assembly in position, and/or to assist in preventing inadvertent rotation or movement of the sonar transducer assembly.

First sonar return data and first facing direction data may be obtained for a first sonar transducer assembly (e.g., via a database, user input, one or more sensors, etc.), and second sonar return data and second facing direction data may be obtained for a second sonar transducer assembly (e.g., via a database, user input, one or more sensors, etc.). The first sonar return data may be positioned based on the first facing direction data to form positioned first sonar return data, and the second sonar return data may be positioned based on the second facing direction data to form positioned second sonar return data. By forming positioned first sonar return data and positioned second sonar return data, the first sonar return data and second sonar return data may be positioned appropriately relative to each other and/or the watercraft. One or more sonar images may then be generated of the underwater environment using the positioned first sonar return data and the positioned second sonar return data. The sonar images may be live sonar images, and, in some embodiments, the images may be two-dimensional or three-dimensional live sonar images. Where live sonar images are being created, sonar return data being used to form the live sonar images may be received at substantially the same time by sonar transducer elements in the first sonar transducer assembly and the second sonar transducer assembly.

With reference to FIG. 12, one or more processors 1268 (or other processors, such as within the sonar transducer assemblies) may be configured to receive sonar return data in response to the one or more sonar signals being transmitted into the body of water 101. As discussed above, the processor 1268 may be configured to generate one or more sonar images based on the one or more sonar returns. In some embodiments, sonar return data from multiple of the sonar transducer assemblies, such as described herein, may be combined or otherwise integrated to form a sonar image of the overall coverage volume. The processor 1268 may determine corresponding facing directions for each sonar transducer assembly and cause relative presentation of the sonar imagery based thereon to form the sonar image of the overall coverage volume. In some embodiments, the sonar transducer assemblies may include one or more sensors that may enable the processor to correlate received sonar return data with a facing direction for use in forming the sonar imagery. In some embodiments, certain sonar transducer assemblies may be assigned or predetermined for their relative orientations. In some embodiments, the resultant sonar image may be a composite of multiple sonar images. In some embodiments, the entire sonar image may be generated together.

Sonar images may be presented in different ways. FIG. 11 illustrates an example display 1159 presenting a live sonar image. A screen 1158 may be presented on the display 1159. In the illustrated embodiment of FIG. 11, the screen 1158 is presented in a split-screen view with a first area 1158A and a second area 1158B. Where a split-screen view is used, a first sonar image and a second sonar image may be generated, with the first sonar image being presented in the first area 1158A and a second sonar image being presented in the second area 1158B. The first sonar image may be generated based on the positioned first sonar return data. The second sonar image may be generated based on the positioned second sonar return data. In some embodiments, a screen 1158 may be presented with a single image, and the screen 1158 may be presented without a split screen view.

FIG. 12 illustrates a block diagram of an example system 1264 according to various embodiments of the present invention described herein. The illustrated system 1264 includes a marine electronic device 1260. The system 1264 may comprise numerous marine devices. As shown in FIG. 12, one or more sonar transducer assemblies 1202A, 1202B, 1202N (collectively referred to as sonar transducer assemblies 1202) may be provided. A radar 1216, a rudder 1210, a primary motor 1205, a trolling motor 1208, and additional sensors/devices 1288 may also be provided as marine devices, but other marine devices may be provided as well. One or more marine devices may be implemented on the marine electronic device 1260. For example, a position sensor 1278, a direction sensor 1220, an autopilot 1270, and other sensors 1280 may be provided within the marine electronic device 1260. These marine devices can be integrated within the marine electronic device 1260, integrated on a watercraft at another location and connected to the marine electronic device 1260, and/or the marine devices may be implemented at a remote device 1286 in some embodiments. The system 1264 may include any number of different systems, modules, or components; each of which may comprise any device or means embodied in either hardware, software, or a combination of hardware and software configured to perform one or more corresponding functions described herein.

The marine electronic device 1260 may include at least one processor 1268, a memory 1272, a communication interface 1282, a user interface 1276, a display 1274, autopilot 1270, and one or more sensors (e.g. position sensor 1278, direction sensor 1220, other sensors 1280). One or more of the components of the marine electronic device 1260 may be located within a housing or could be separated into multiple different housings (e.g., be remotely located).

The processor(s) 1268 may be any means configured to execute various programmed operations or instructions stored in a memory device (e.g., memory 1272) such as a device or circuitry operating in accordance with software or otherwise embodied in hardware or a combination of hardware and software (e.g. a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processor(s) 1268 as described herein. For example, the processor(s) 1268 may be configured to analyze sonar return data for various features/functions described herein (e.g., generate a sonar image, determine an object and/or object position, etc.).

In some embodiments, the processor(s) 1268 may be further configured to implement signal processing. In some embodiments, the processor(s) 1268 may be configured to perform enhancement features to improve the display characteristics of data or images, collect or process additional data, such as time, temperature, GPS information, waypoint designations, or others, or may filter extraneous data to better analyze the collected data. The processor(s) 1268 may further implement notices and alarms, such as those determined or adjusted by a user, to reflect proximity of other objects (e.g., represented in sonar data), to reflect proximity of other vehicles (e.g. watercraft), approaching storms, etc.

In an example embodiment, the memory 1272 may include one or more non-transitory storage or memory devices such as, for example, volatile and/or non-volatile memory that may be either fixed or removable. The memory 1272 may be configured to store instructions, computer program code, sonar data, and additional data such as radar data, chart data, location/position data in a non-transitory computer readable medium for use, such as by the processor(s) 1268 for enabling the marine electronic device 1260 to carry out various functions in accordance with example embodiments of the present invention. For example, the memory 1272 could be configured to buffer input data for processing by the processor(s) 1268. Additionally or alternatively, the memory 1272 could be configured to store instructions for execution by the processor(s) 1268.

The communication interface 1282 may be configured to enable communication to external systems (e.g. an external network 1284). In this manner, the marine electronic device 1260 may retrieve stored data from a remote device 1286 via the external network 1284 in addition to or as an alternative to the onboard memory 1272. Additionally or alternatively, the marine electronic device 1260 may transmit or receive data, such as sonar signal data, sonar return data, sonar image data, or the like to or from a sonar transducer assembly 1202A. In some embodiments, the marine electronic device 1260 may also be configured to communicate with other devices or systems (such as through the external network 1284 or through other communication networks, such as described herein). For example, the marine electronic device 1260 may communicate with a propulsion system of the watercraft 100 (e.g., for autopilot control); a remote device (e.g., a user's mobile device, a handheld remote, etc.); or another system. Using the external network 1284, the marine electronic device may communicate with and send and receive data with external sources such as a cloud, server, etc. The marine electronic device may send and receive various types of data. For example, the system may receive weather data, data from other fish locator applications, alert data, among others. However, this data is not required to be communicated using external network 1284, and the data may instead be communicated using other approaches, such as through a physical or wireless connection via the communications interface 1282.

The communications interface 1282 of the marine electronic device 1260 may also include one or more communications modules configured to communicate with one another in any of a number of different manners including, for example, via a network. In this regard, the communications interface 1282 may include any of a number of different communication backbones or frameworks including, for example, Ethernet, the NMEA 2000 framework, GPS, cellular, Wi-Fi, or other suitable networks. The network may also support other data sources, including GPS, autopilot, engine data, compass, radar, etc. In this regard, numerous other peripheral devices (including other marine electronic devices or sonar transducer assemblies) may be included in the system 1264.

The position sensor 1278 may be configured to determine the current position and/or location of the marine electronic device 1260 (and/or the watercraft 100). For example, the position sensor 1278 may comprise a GPS, bottom contour, inertial navigation system, such as machined electromagnetic sensor (MEMS), a ring laser gyroscope, or other location detection system. Alternatively or in addition to determining the location of the marine electronic device 1260 or the watercraft 100, the position sensor 1278 may also be configured to determine the position and/or orientation of an object outside of the watercraft 100.

The display 1274 (e.g. one or more screens) may be configured to present images and may include or otherwise be in communication with a user interface 1276 configured to receive input from a user. The display 1274 may be, for example, a conventional LCD (liquid crystal display), a touch screen display, mobile device, or any other suitable display known in the art upon which images may be displayed.

In some embodiments, the display 1274 may present one or more sets of data (or images generated from the one or more sets of data). Such data includes chart data, radar data, sonar data, weather data, location data, position data, orientation data, sonar data, or any other type of information relevant to the watercraft. Sonar data may be received from one or more sonar transducer assemblies 1202 or from sonar devices positioned at other locations, such as remote from the watercraft. Additional data may be received from marine devices such as a radar 1216, a primary motor 1205 or an associated sensor, a trolling motor 1208 or an associated sensor, an autopilot 1270, a rudder 1210 or an associated sensor, a position sensor 1278, a direction sensor 1220, other sensors 1280, a remote device 1286, onboard memory 1272 (e.g., stored chart data, historical data, etc.), or other devices.

In some further embodiments, various sets of data, referred to above, may be superimposed or overlaid onto one another. For example, a route may be applied to (or overlaid onto) a chart (e.g. a map or navigational chart). Additionally or alternatively, depth information, weather information, radar information, sonar information, or any other navigation system inputs may be applied to one another.

The user interface 1276 may include, for example, a keyboard, keypad, function keys, mouse, scrolling device, input/output ports, touch screen, or any other mechanism by which a user may interface with the system.

Although the display 1274 of FIG. 12 is shown as being directly connected to the processor(s) 1268 and within the marine electronic device 1260, the display 1274 could alternatively be remote from the processor(s) 1268 and/or marine electronic device 1260. Likewise, in some embodiments, the position sensor 1278 and/or user interface 1276 could be remote from the marine electronic device 1260.

The marine electronic device 1260 may include one or more other sensors/devices 1280, such as configured to measure or sense various other conditions. The other sensors/devices 1280 may include, for example, an air temperature sensor, a water temperature sensor, a current sensor, a light sensor, a wind sensor, a speed sensor, or the like.

The sonar transducer assemblies 1202 illustrated in FIG. 12 may include one or more sonar transducer array(s) and/or elements 1267, such as described herein. In some embodiments, additional separate sonar transducer elements (arranged to operate alone, in an array, or otherwise) may be included. The sonar transducer assemblies 1202 may also include a sonar signal processor or other processor (although not shown) configured to perform various sonar processing. In some embodiments, the processor (e.g., processor(s) 1268 in the marine electronic device 1260, a controller (or processor portion) in the sonar transducer assemblies 1202, or a remote controller— or combinations thereof) may be configured to filter sonar return data and/or selectively control transducer element(s) 1267. For example, various processing devices (e.g., a multiplexer, a spectrum analyzer, A-to-D converter, etc.) may be utilized in controlling or filtering sonar return data and/or transmission of sonar signals from the transducer element(s) 1267.

The sonar transducer assemblies 1202 may also include one or more other systems, such as various sensor(s) 1266. For example, the sonar transducer assembly 1202A may include an orientation sensor, such as gyroscope or other orientation sensor (e.g., accelerometer, MEMS, direction, etc.) that can be configured to determine the relative orientation and/or direction of the sonar transducer assembly 1202A and/or the one or more sonar transducer array(s) and/or element(s) 1267 — such as with respect to the watercraft. In some embodiments, additionally or alternatively, other types of sensor(s) are contemplated, such as, for example, a water temperature sensor, a current sensor, a light sensor, a wind sensor, a speed sensor, or the like.

The components presented in FIG. 12 may be rearranged to alter the connections between components. For example, in some embodiments, a marine device outside of the marine electronic device 1260, such as the radar 1216, may be directly connected to the processor(s) 1268 rather than being connected to the communication interface 1282. Additionally, sensors and devices implemented within the marine electronic device 1260 may be directly connected to the communications interface 1282 in some embodiments rather than being directly connected to the processor(s) 1268.

Methods for generating a live sonar image of an underwater environment having an expanded coverage volume are also contemplated. FIG. 13 illustrates a flow chart with an example method 1300 for forming a live sonar image. At operation 1302, transmission of sonar beams may be caused. This may be done by causing an array having a plurality of sonar transducer elements to transmit one or more sonar beams into the underwater environment. In some instances, this may be done by causing sonar transducer elements from multiple arrays to transmit sonar beams into the underwater environment.

First sonar return data may be received at operation 1304, and second sonar return data may be received at operation 1306. First sonar return data may be received from a first sonar transducer assembly, and this first sonar transducer assembly may include one or more arrays with one or more sonar transducer elements in each of the arrays. Second sonar return data may be received from a second sonar transducer assembly, and this second sonar transducer assembly may include one or more arrays with one or more sonar transducer elements in each of the arrays.

At operation 1308, first facing direction data may be received, and second facing direction data may be received at operation 1310. First facing direction data and second facing direction data may be received in a variety of ways. For example, this facing direction data may be received from sensors that are provided in a first sonar transducer assembly and a second sonar transducer assembly, the facing direction data may be manually input be an installer, or default facing direction data may automatically apply with it being assumed that the installer will provide the sonar transducer assemblies in the appropriate orientation. Where sensors are utilized, the sensors may be configured to detect the orientation of the relevant sonar transducer assembly. The facing direction data may also be provided in other ways.

At operation 1312, the first sonar return data may be positioned based on the first facing direction data, and the second sonar return data may be positioned based on the second facing direction data at operation 1314. Positioning of the first sonar return data may form positioned first sonar return data, and positioning of the second sonar return data may form positioned second sonar return data.

At operation 1316, at least one live sonar image is generated using the positioned first sonar return data and the positioned second sonar return data. In some embodiments, two different live sonar images are created, with a first live sonar image being formed using the positioned first sonar return data and with the second live sonar image being formed using the positioned second sonar return data. However, in other embodiments, a single live sonar image is created based on the positioned first sonar return data and the positioned second sonar return data.

At operation 1318, presentation of the live sonar image(s) may be caused on a display. Where multiple live sonar images have been created, the live sonar images may be presented in a split-screen view with the live sonar images positioned adjacent to each other so that the represented sonar coverage in the images extends continuously between the images.

The method 1300 is only one example method for forming a live sonar image, and the method 1300 may be modified in other embodiments. Certain operations may be omitted from the method 1300. For example, operations 1302 and/or 1318 may be omitted in some embodiments. Furthermore, certain operations may be added to method 1300. For example, additional sonar return data may be received where three or more sonar transducer assemblies are utilized. Certain operations of the method may be performed simultaneously (e.g. operations 1306 and 1308 may occur simultaneously), and the order of operations may be changed (e.g. operations 1308 and 1310 may occur before operations 1304 and 1306).

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

That which is claimed:

1. A sonar system for generating live sonar images having an expanded coverage angle, the sonar system comprising:
   two or more sonar transducer assemblies including:
      a first sonar transducer assembly that has a first plurality of sonar transducer elements, wherein the first sonar transducer assembly defines a first facing direction, wherein the first plurality of sonar transducer elements are configured to transmit one or more first sonar beams into an underwater environment to form a first coverage volume within the underwater environment; and
      a second sonar transducer assembly that has a second plurality of sonar transducer elements, wherein the second sonar transducer assembly defines a second facing direction, wherein the second plurality of sonar transducer elements are configured to transmit one or more second sonar beams into the underwater environment to form a second coverage volume within the underwater environment;
   one or more alignment features, wherein the one or more alignment features are configured to position the first sonar transducer assembly and the second sonar transducer assembly so that the first facing direction and the second facing direction are different and relative to each other so as to create continuous coverage of the underwater environment, wherein the continuous coverage has an overall coverage volume that is greater than either of the first coverage volume or the second coverage volume individually;
   at least one processor;
   a memory including computer program code configured to, when executed, cause the at least one processor to:
      receive first sonar return data from the first plurality of sonar transducer elements;
      receive second sonar return data from the second plurality of sonar transducer elements;
      receive first facing direction data regarding the first facing direction of the first sonar transducer assembly;
      receive second facing direction data regarding the second facing direction of the second sonar transducer assembly;
      position the first sonar return data based on the first facing direction data to form positioned first sonar return data;
      position the second sonar return data based on the second facing direction data to form positioned second sonar return data; and
      generate a live sonar image of the underwater environment using the positioned first sonar return data and the positioned second sonar return data;
   wherein the first facing direction and the second facing direction are generally outward and downward of the watercraft such that the live sonar image is representative of the underwater environment underneath the watercraft.

2. The sonar system of claim 1, wherein an overlap volume is defined as a volume where the first coverage volume and the second coverage volume overlap.

3. The sonar system of claim 2, wherein sonar return data from only one of the first sonar transducer assembly or the second sonar transducer assembly is used in the overlap volume.

4. The sonar system of claim 2, wherein sonar return data from both the first sonar transducer assembly and the second sonar transducer assembly is used in the overlap volume.

5. The sonar system of claim 1, wherein the first sonar transducer assembly includes a first sensor configured to obtain the first facing direction data regarding the first facing direction of the first sonar transducer assembly relative to the watercraft, wherein the second sonar transducer assembly includes a second sensor configured to obtain the second facing direction data regarding the second facing direction of the second sonar transducer assembly relative to the watercraft, wherein the computer program code is configured to, when executed, cause the at least one processor to:
receive the first facing direction data from the first sensor; and
receive the second facing direction data from the second sensor.

6. The sonar system of claim 1, further comprising at least one bracket, wherein the at least one bracket is configured to position the first sonar transducer assembly and the second sonar transducer assembly, wherein the one or more alignment features are provided on the at least one bracket.

7. The sonar system of claim 6, wherein the at least one bracket includes a first bracket and a second bracket, wherein the first bracket is configured to position the first sonar transducer assembly, wherein the second bracket is configured to position the second sonar transducer assembly.

8. The sonar system of claim 6, further comprising a first clamp, wherein the at least one bracket is configured to be attached to the first clamp, wherein the at least one bracket is configured to be rotated relative to the first clamp when attached to the first clamp.

9. The sonar system of claim 8, further comprising a second clamp, wherein the at least one bracket includes a first bracket and a second bracket, wherein the first bracket is configured to be attached to the first clamp, wherein the second bracket is configured to be attached to the second clamp.

10. The sonar system of claim 1, wherein the overall coverage volume includes a downward coverage angle, wherein the downward coverage angle defines an angle that is at least 140 degrees.

11. The sonar system of claim 1, wherein the overall coverage volume includes a downward coverage angle, wherein the downward coverage angle defines an angle that is at least 150 degrees.

12. The sonar system of claim 11, wherein the overall coverage volume includes a downward coverage angle, wherein the downward coverage angle defines an angle that is at least 180 degrees.

13. The sonar system of claim 12, wherein the downward coverage angle provides at least 180 degrees of continuous side-to-side downward coverage.

14. The sonar system of claim 12, wherein the downward coverage angle provides at least 180 degrees of continuous front-to-back downward coverage.

15. The sonar system of claim 11, wherein the two or more sonar transducer assemblies are rotatably mounted with respect to the watercraft such that the overall coverage angle rotates with respect to the watercraft.

16. The sonar system of claim 1, further comprising:
a display,
wherein the memory including computer program code is configured to, when executed, cause the at least one processor to:
cause the first plurality of sonar transducer elements and the second plurality of sonar transducer elements to transmit the one or more sonar beams into the underwater environment; and
cause, on the display, presentation of the live sonar image,
wherein the live sonar image is a two-dimensional live sonar image that is formed of the first sonar return data and second sonar return data, and wherein the first sonar return data and the second sonar return data used to form the live sonar image was received at substantially a same time by the first plurality of sonar transducer elements and the second plurality of sonar transducer elements.

17. The sonar system of claim 1, wherein the first facing direction is at least partially in a forward direction relative to the watercraft, wherein the second facing direction is at least partially in a backward direction relative to the watercraft.

18. A sonar system for generating live sonar images having an expanded coverage angle, the sonar system comprising:
a first sonar transducer assembly having at least one array of a first plurality of sonar transducer elements, wherein the first sonar transducer assembly defines a first facing direction;
one or more alignment features, wherein the one or more alignment features are configured to position the first sonar transducer assembly to obtain the first facing direction;
at least one processor; and
a memory including computer program code configured to, when executed, cause the at least one processor to:
receive first sonar return data from the first plurality of sonar transducer elements;
receive first facing direction data regarding the first facing direction of the first sonar transducer assembly; and
generate a live sonar image of the underwater environment based on the first sonar return data and the first facing direction data;
wherein the first plurality of sonar transducer elements are associated with a watercraft on a body of water, wherein the first facing direction is generally outward of the watercraft and is at least partially in a downward direction relative to the watercraft, wherein the first plurality of sonar transducer elements are configured to transmit one or more sonar beams into an underwater environment, wherein the live sonar image provides a continuous front-to-back downward image.

19. The sonar system of claim 18, wherein the continuous front-to-back downward image covers a downward coverage angle that is at least 180 degrees.

20. A method of generating a live sonar image of an underwater environment having an expanded coverage volume, the method comprising:
receiving first sonar return data from a first plurality of sonar transducer elements;
receiving second sonar return data from a second plurality of sonar transducer elements;
receiving first facing direction data regarding a first facing direction of a first sonar transducer assembly;

receiving second facing direction data regarding a second facing direction of a second sonar transducer assembly;

positioning the first sonar return data based on the first facing direction data to form positioned first sonar return data;

positioning the second sonar return data based on the second facing direction data to form positioned second sonar return data; and generating a live sonar image of the underwater environment using the positioned first sonar return data and the positioned second sonar return data.

21. The method of claim 20, further comprising:

causing, on the display, presentation of the live sonar image, wherein the live sonar image provides a continuous front-to-back downward image.

* * * * *